United States Patent
Schlanger

(10) Patent No.: US 10,676,149 B2
(45) Date of Patent: Jun. 9, 2020

(54) VEHICLE WHEEL AXLE ASSEMBLY

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 260 days.

(21) Appl. No.: 15/681,410

(22) Filed: Aug. 20, 2017

(65) Prior Publication Data

US 2017/0361895 A1 Dec. 21, 2017

Related U.S. Application Data

(63) Continuation-in-part of application No. 14/974,228, filed on Dec. 18, 2015, now abandoned, and a continuation-in-part of application No. 14/974,451, filed on Dec. 18, 2015, now Pat. No. 9,758,209, which is a continuation-in-part of application No. 14/958,263, filed on Dec. 3, 2015, now Pat. No. 10,112,439, which is a continuation-in-part of application No. 14/952,645, filed on Nov. 25, 2015, now Pat. No. 9,815,329, which is a continuation-in-part of application No. 14/602,543, filed on Jan. 22, 2015, now Pat. No. 9,561,833, which is a continuation-in-part of application No. 13/914,490, filed on Jun. 10, 2013, now Pat. No. 9,446,626, which is a continuation-in-part of application No. 12/655,433, filed on Dec. 30, 2009, now Pat. No. 8,485,335.

(60) Provisional application No. 62/381,155, filed on Aug. 30, 2016, provisional application No. 62/124,391, filed on Dec. 18, 2014, provisional application No.

(Continued)

(51) Int. Cl.
*B62K 25/02* (2006.01)
*B60B 27/02* (2006.01)
*F16B 2/18* (2006.01)

(52) U.S. Cl.
CPC ............ *B62K 25/02* (2013.01); *B60B 27/026* (2013.01); *B60B 27/023* (2013.01); *B62K 2206/00* (2013.01); *F16B 2/185* (2013.01)

(58) Field of Classification Search
CPC ..... B60B 27/023; B60B 27/026; B62K 25/02; B62K 2206/00
See application file for complete search history.

(56) References Cited

U.S. PATENT DOCUMENTS

| 6,089,675 A | 7/2000 | Schlanger |
| 6,374,975 B1 * | 4/2002 | Schlanger ............. B60B 27/026 192/46 |

(Continued)

*Primary Examiner* — Kip T Kotter

(57) ABSTRACT

An axle assembly including: an axle sleeve having first and second end faces, an axially extending through opening, and a radially extending first engagement surface; and a control shaft extending within the opening and having a radially extending second engagement surface. The control shaft is axially displaceable relative to the axle sleeve and is axially retained to the axle sleeve by means of an overlie engagement between the first and second engagement surfaces. At least one of the first and second engagement surfaces is radially displaceable between an engaged orientation corresponding to the overlie engagement and a released orientation corresponding to a release of the overlie engagement. The overlie engagement serves to axially retain the control shaft to the axle sleeve and the released orientation serves to remove the overlie engagement and permit the control shaft to be axially withdrawn and separated from the axle sleeve in the retracting direction.

41 Claims, 16 Drawing Sheets

Related U.S. Application Data

61/965,201, filed on Jan. 27, 2014, provisional application No. 61/204,130, filed on Jan. 2, 2009.

(56) References Cited

U.S. PATENT DOCUMENTS

| | | | | |
|---|---|---|---|---|
| 6,435,622 | B1* | 8/2002 | Kanehisa | B60B 27/0005 |
| | | | | 301/110.5 |
| 6,669,306 | B1* | 12/2003 | Hara | B60B 27/0078 |
| | | | | 280/288 |
| 7,648,211 | B2* | 1/2010 | Watarai | B60B 27/0052 |
| | | | | 301/110.5 |
| 2008/0315678 | A1* | 12/2008 | Watarai | B60B 27/0052 |
| | | | | 301/110.5 |
| 2009/0115241 | A1* | 5/2009 | Kanehisa | B62K 25/02 |
| | | | | 301/124.2 |
| 2016/0375950 | A1 | 12/2016 | Mercat | |

* cited by examiner

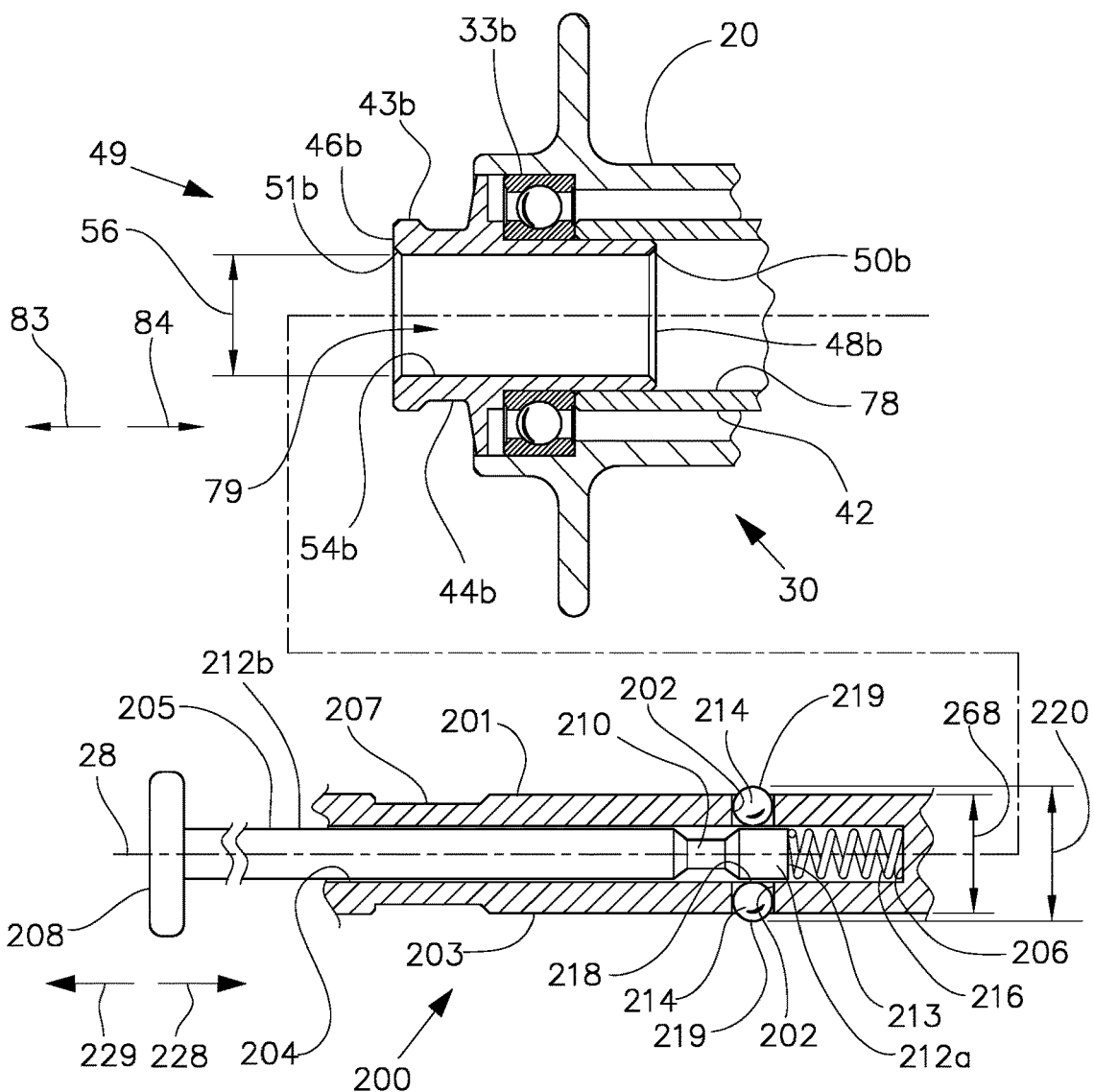
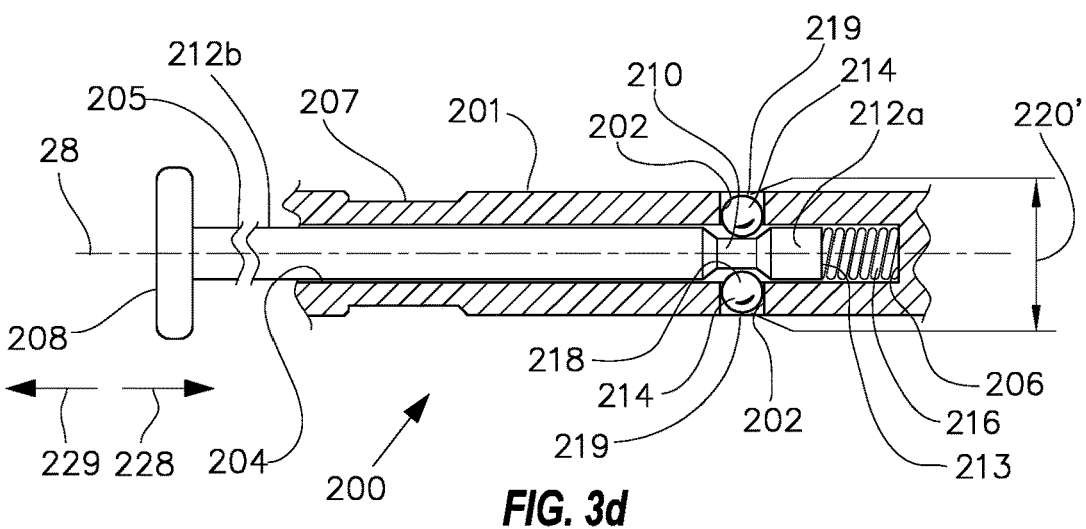
FIG. 3c
FIG. 3d

VEHICLE WHEEL AXLE ASSEMBLY

CROSS-REFERENCE TO RELATED APPLICATION

This application claims priority of U.S. Provisional Patent Application 62/381,155, filed Aug. 30, 2016 and entitled "VEHICLE WHEEL AXLE ASSEMBLY".

This application is also a Continuation-In-Part of U.S. patent application Ser. No. 14/974,228, filed Dec. 18, 2015, which is currently pending.

This application is also a Continuation-In-Part of U.S. patent application Ser. No. 14/974,451, filed Dec. 18, 2015, which was issued as U.S. Pat. No. 9,758,209 on Sep. 12, 2017.

U.S. patent application Ser. No. 14/974,451 claimed priority of U.S. Provisional Patent Application 62/124,391, filed Dec. 18, 2014, which has since expired.

U.S. patent application Ser. No. 14/974,451 is also a Continuation-In-Part of U.S. patent application Ser. No. 14/958,263 filed Dec. 3, 2015, which was issued as U.S. Pat. No. 10,112,439 on Oct. 30, 2018.

U.S. patent application Ser. No. 14/958,263 is a Continuation-In-Part of U.S. patent application Ser. No. 14/952,645 filed Nov. 25, 2015, which was issued as U.S. Pat. No. 9,815,329 on Nov. 14, 2017.

U.S. patent application Ser. No. 14/952,645 is a Continuation-In-Part of U.S. patent application Ser. No. 14/602,543 filed Jan. 22, 2015, which was issued as U.S. Pat. No. 9,561,833 on Feb. 2, 2017.

U.S. patent application Ser. No. 14/602,543 claimed priority of U.S. Provisional Patent Application 61/965,201 filed Jan. 27, 2014, which has since expired.

U.S. patent application Ser. No. 14/602,543 is also a Continuation-In-Part of U.S. patent application Ser. No. 13/914,490 filed Jun. 10, 2013, which was issued as U.S. Pat. No. 9,446,626 on Sep. 20, 2016.

U.S. patent application Ser. No. 13/914,490 is a Continuation-In-Part of U.S. patent application Ser. No. 12/655,433 filed Dec. 30, 2009, which was issued as U.S. Pat. No. 8,485,335 on Jul. 16, 2013.

U.S. patent application Ser. No. 12/655,433 claimed priority of U.S. Provisional Patent Application 61/204,130 filed Jan. 2, 2009, which has since expired.

BACKGROUND

Field of the Invention

The present invention relates to a vehicle wheel axle assembly including a stationary axle. The axle assembly includes an axle sleeve and a control shaft that is axially guided and axially displaceable within the axle sleeve. The axle assembly includes a yieldable retaining means that may: control the axial position of the control shaft relative to the axle sleeve; retain the control shaft with the axle sleeve; and provide tactile feedback to the operator that may be used to signal the preferred axial position of the control shaft relative to the axle sleeve. Preferably, the control shaft is and coaxial and rotatable relative to the axle sleeve.

Discussion of Prior Art

U.S. Pat. No. 6,089,675 describes a vehicle (i.e. bicycle) wheel hub that includes a control shaft that is internally coaxial with an axle sleeve. As illustrated in FIGS. 4a-f of this patent, the control shaft is axially displaceable relative to the axle sleeve, however the control shaft has a blocking engagement with the axle sleeve that prevents the control shaft from being withdrawn and removed from the axle sleeve.

It is often desirable to remove the control shaft from the axle sleeve in order to service the hub and/or to replace the control shaft with a different type. For example, different bicycles may include dropouts that have different threading or that may be of a different type. In such a case, when swapping wheels and bicycle frames, it may be desirable to also swap out the control shaft to insure compatibility with the dropouts of a given frame. Since the control shaft of U.S. Pat. No. 6,089,675 cannot be removed from the sleeve, the entire axle assembly must be disassembled in order to replace the control shaft. This is a great inconvenience to the operator since this is a time-consuming procedure and also requires special tools and skills that many operators may not have.

While there are conventional through-axle axle assemblies available, these assemblies lack any means to retain the control shaft with the axle sleeve and the control shaft may easily become inadvertently separated from the axle sleeve. This is an inconvenience for the operator. Further, the control shaft may then become lost or misplaced or damaged. Further, these conventional through-axle assemblies do not require, nor do they provide, any means to control the axial position of the control shaft relative to the axle sleeve.

In certain axle assemblies, such as FIGS. 4a-f of U.S. Pat. No. 6,089,675, it is desirable to provide some means to control the axial position of the control shaft, particularly when positioning the control shaft in the precise axial location such that it may be radially assembled and disassembled to the dropouts. Since conventional through-axle assemblies lack this ability for axial position control, the operator must manually position the control shaft in the proper axial position by trial-and-error in order to install and remove the wheel to/from the dropouts of the frame. For the operator, this adds significant frustration, complexity, and skill requirement to this installation and removal process.

Accordingly, it is an objective of the present invention to overcome the forgoing disadvantages and provide an improved vehicle wheel hub assembly, particularly as applied to a bicycle wheel.

SUMMARY OF THE INVENTION

Objects and Advantages

The present invention utilizes an engagement interface between the control shaft and the axle sleeve. This engagement interface may be a passively yieldable engagement interface or it may be an actively engaged engagement interface. In either case, this interface serves to retain the control shaft with the axle sleeve, which restricts the control shaft from being inadvertently separated and helps to prevent it from being lost, misplaced, or damaged.

Further, this interface can be utilized to provide a stop to restrain and/or limit the axial travel of the control shaft at a predetermined axial position relative to the axle sleeve. This may serve to control the axial position of the control shaft in the extending direction and/or the retracting direction such that the control shaft is properly axially aligned to provide the requisite clearance to install and remove the wheel to/from the dropouts of the frame.

Still further, this interface may serve to provide tactile feedback to the operator to indicate that the control shaft is in the predetermined axial position relative to the axle sleeve. This provides a helpful convenience for the operator and eliminates the trial-and-error associated with axially positioning the control shaft of conventional through-axle arrangements. In the case where the pre-determined axial position corresponds to the retracted position, this minimizes the operator's frustration, complexity, and skill requirement associated with the wheel installation and removal process.

Yet further, in the case where this interface is a passively yieldable interface, the operator needs merely to overcome this yieldable interface in order to withdraw and remove the control shaft from the axle sleeve, without any additional action required. This is a highly intuitive process that requires very little instruction to the operator.

Since the control shaft may be easily withdrawn and removed from the axle sleeve, the operator may easily swap out different control shafts and may easily service and clean the control shaft without completely disassembling the hub assembly.

BRIEF DESCRIPTION OF THE DRAWINGS

The present invention will be more readily understandable from a consideration of the accompanying drawings, wherein:

FIG. 3c is an exploded axial cross-section view of a fourth embodiment of the present invention, corresponding to the embodiment of FIG. 2a, showing an alternate control shaft of the embodiment of FIG. 2a in its engaged and locked orientation, where the restraining means is actively actuated and lockable, with locking engagement balls substituted for the o-ring, and with a locking pin to lock the balls in a radially outwardly position;

FIG. 3d is an axial cross-section view of the control shaft of the embodiment of FIG. 3c, showing the control shaft actively placed in the released and unlocked orientation where the engagement balls are radially released to a radially inward position;

FIG. 4e is an orthogonal view detailing the spring of the embodiment of FIG. 4a;

FIG. 4f is an axial cross section view detailing the collar of the embodiment of FIG. 4a;

DETAILED DESCRIPTION OF THE INVENTION

Figure 1:
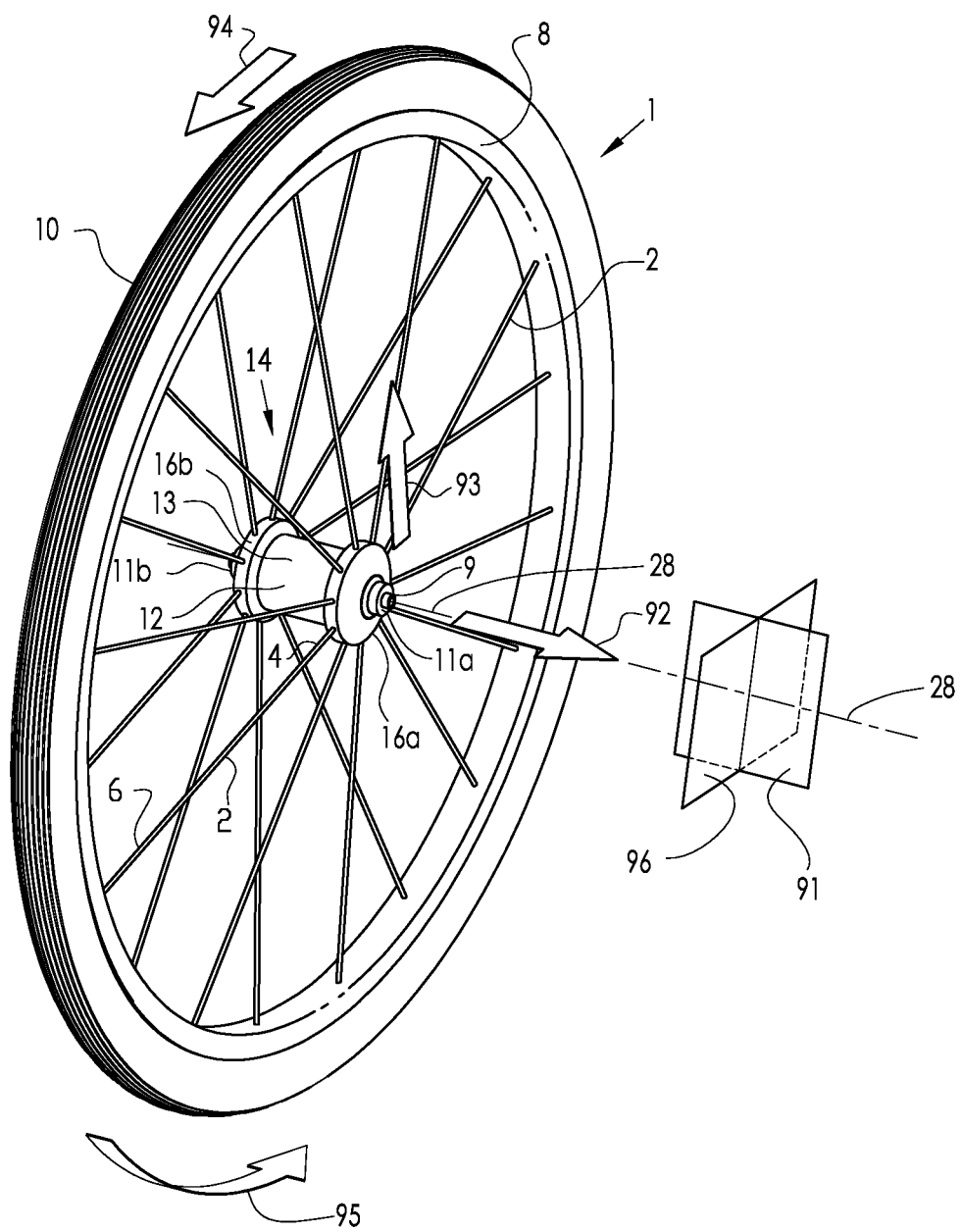
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 16a and 16b may be contiguous with the hub shell 12 or may be separately formed and assembled to the hub body 13 portion of the hub shell 12. The spokes 2 are affixed to the hub flanges 16a or 16b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

Figure 2A:
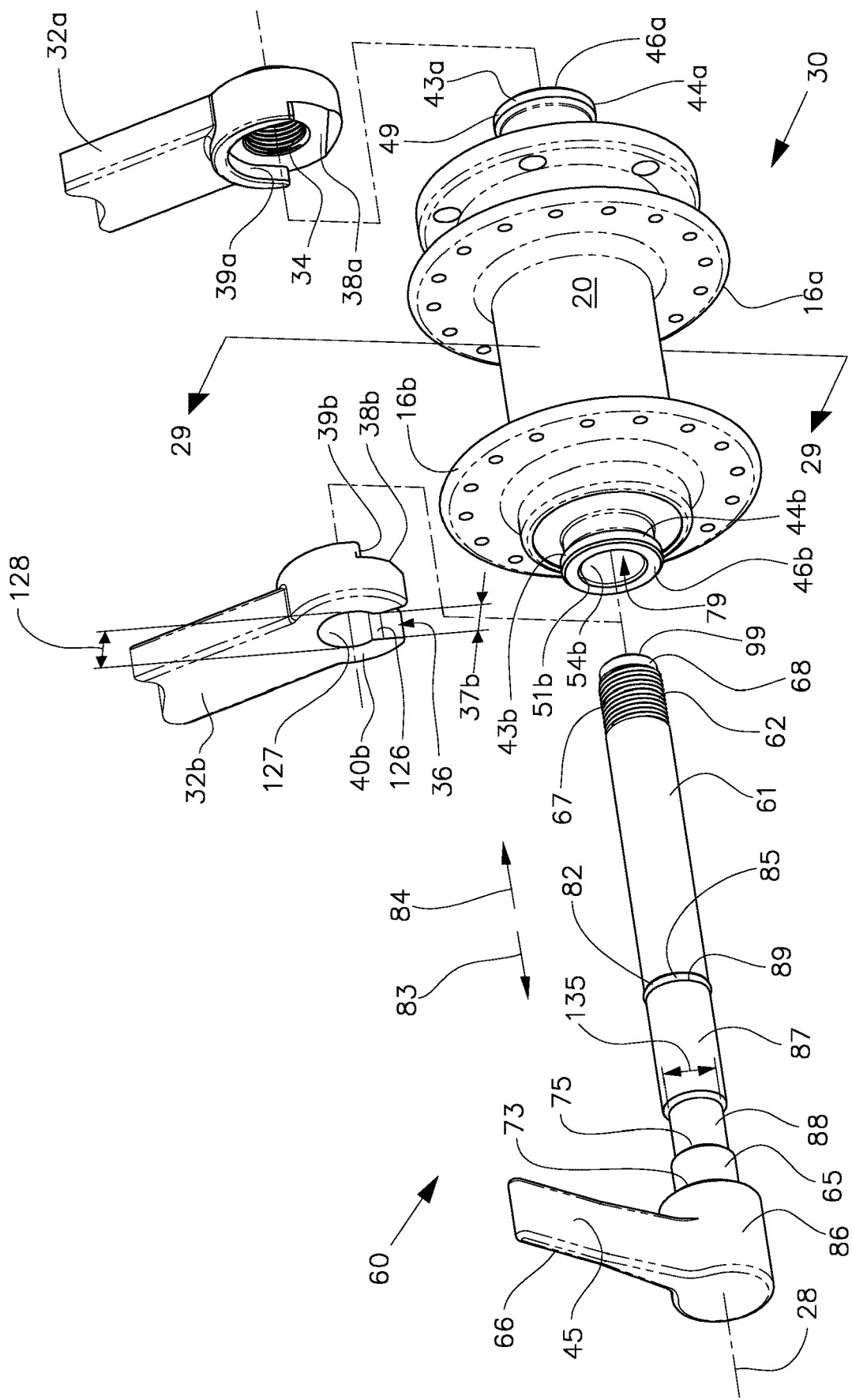
FIG. 2a is an exploded perspective view of a first embodiment of the present invention, showing the dropouts of the bicycle frame and a hub assembly, including a control shaft assembly shown prior to its assembly with the axle sleeve.

FIGS. 2a-j describe an embodiment of the present invention with a threaded engagement between a control shaft of a hub assembly and the dropout of the frame. In this embodiment, the frame includes an open-slotted dropout axially opposed to this threaded engagement, for quick and easy wheel removal. FIG. 2a is an exploded view, showing the control shaft prior to assembly with the axle sleeve and with the hub assembly prior to its assembly with the dropouts.

Figure 2B:
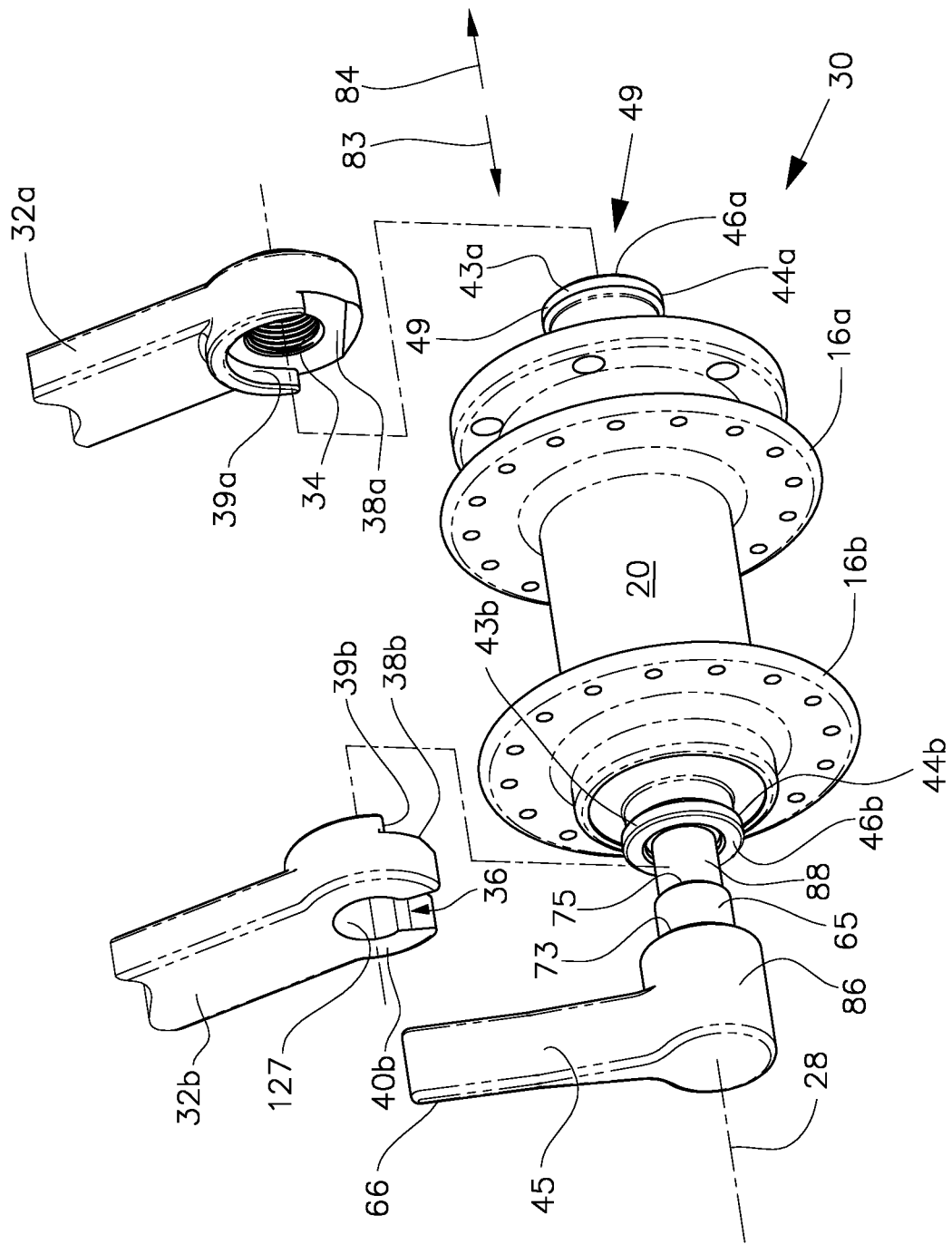
FIG. 2b is an exploded perspective view of the embodiment of FIG. 2a, with the control shaft first assembled to the axle sleeve and with the hub assembly in preparation for its assembly with the dropouts, and with the control shaft shown in the retracted position.
Figure 2C:
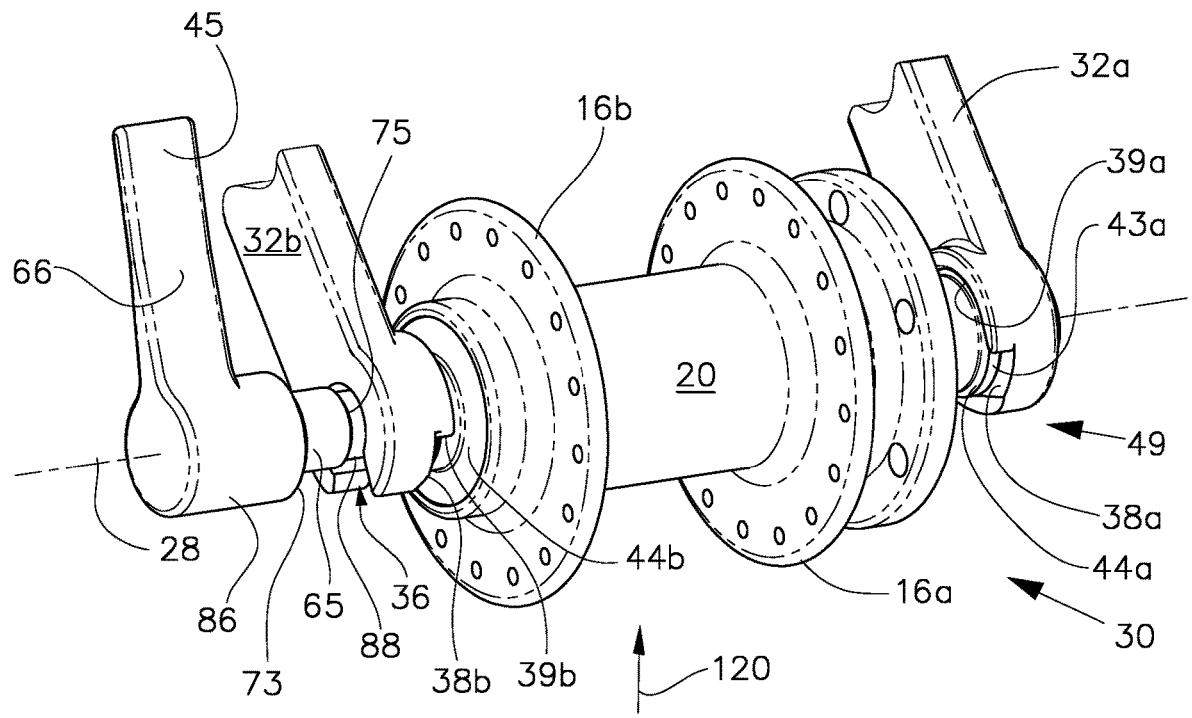
FIG. 2c is a perspective view of the embodiment of FIG. 2a, with the hub assembly next radially pre-assembled to the dropouts, with the control shaft still in the retracted position.
Figure 2D:
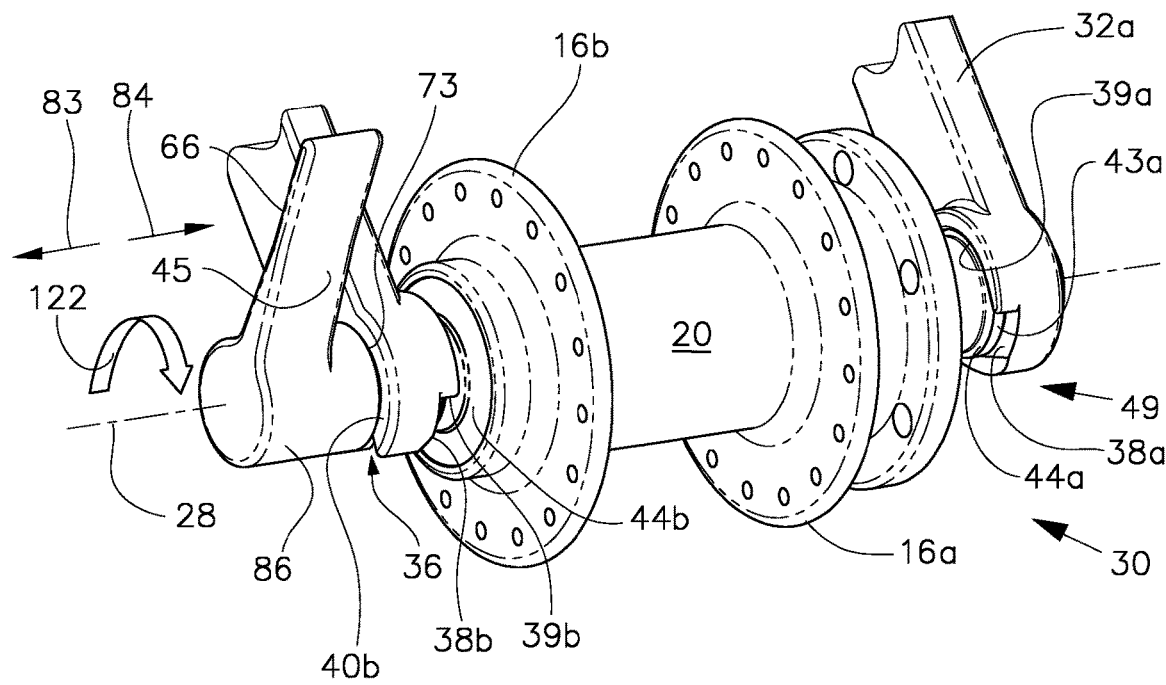
FIG. 2d is a perspective view of the embodiment of FIG. 2a, with the control shaft next displaced to the extended position such that the collar portion is axially overlapping the second dropout and the engagement end is threadably assembled to the right dropout.
Figure 2E:
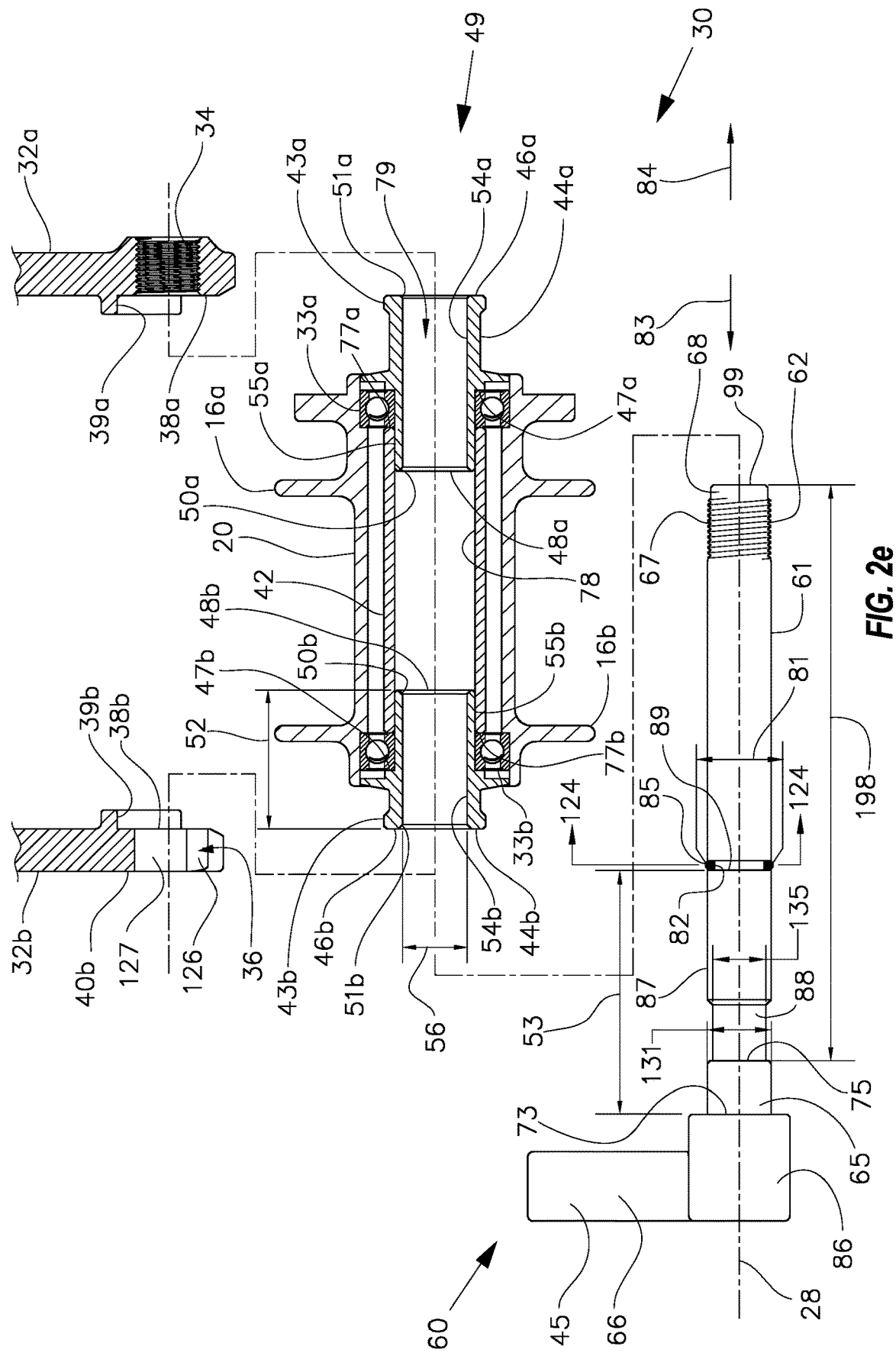
FIG. 2e is an exploded axial cross-section view of the embodiment of FIG. 2a, corresponding to the assembly sequence of FIG. 2a, showing the dropouts of the bicycle frame and the hub assembly, including a control shaft assembly shown prior to its assembly with the axle sleeve.

Referring to FIGS. 2a and 2e, dropouts 32a (left dropout) and 32b (right dropout) may be considered mounting portions of the bicycle (not shown) and constitute the portion of the frame (not shown) to which the hub assembly 30 is mounted or connected. Left dropout 32a is of a generally conventional design to accept through-axle hubs and includes an internally threaded hole 34, axially inboard face 38a, and alignment surface 39a. Right dropout 32b includes an open keyhole slot 36 that is radially stepped to include a narrower necked entrance region 126 of radial width 37b and a wider enlarged circular pilot region 127 of radial width 128. This radial step occurs within the axial region between inboard face 38b and outboard face 40b. Dropout 32b also includes an axially inboard face 38b, and an axially outboard face 40b. Inboard faces 38a and 38b each include a corresponding axially inwardly projecting alignment surfaces 39a and 39b to provide radial positioning location of mating alignment surfaces 43a and 43b of axlecaps 44a and 44b respectively. Open keyhole slot 36 has a radially extending open entrance to receive the control shaft assembly 60.

Inboard faces 38a and 38b are axially opposed and face each other, while outer face 40b is axially opposed to inboard face 38b. Width 37b of the necked entrance region 126 of open slot 36 is sized to receive the necked portion 88 of the control shaft 61 and width 128 of the pilot region 127 is sized to receive collar portion 65. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes sleeve assembly 49, bearing assemblies 33a and 33b, and hub shell 20. In this case, the sleeve assembly 49 is generally stationary and intended to be rotationally fixed to the frame of the bicycle, while the hub shell 20 is rotatable about axial axis 28 and about the sleeve assembly 49 by means of bearing assemblies 33a and 33b. Bearing assemblies 33a and 33b are shown here as conventional "cartridge" type bearing assemblies, including rolling elements, an inner race, and an outer race. The hub shell 20 includes two hub flanges 16a and 16b that are adapted to connect with the first ends of spokes (not shown) in the conventional manner. The sleeve assembly 49 includes sleeve 42 and axlecaps 44a and 44b. The control shaft assembly 60 includes the control shaft 61 with handle 66, and o-ring 82.

As particularly shown in FIG. 2e, axlecaps 44a and 44b each include respective outer faces 46a and 46b, collar portions 55a and 55b with end faces 48a and 48b, cylindrical alignment surfaces 43a and 43b, shoulders 47a and 47b, and axially extending holes 54a and 54b therethrough with axially inboard chamfers 50a and 50b and axially outboard chamfers 51a and 51b. Chamfers 51a, 51b, 50a, and 50b may be considered to ba radially extending and projecting surfaces that are also axially tapered to create a funnel-shaped profile. The diameter 56 of holes 54a and 54b are preferably sized to provide a radially piloting sliding fit with the shank portion 87 of the control shaft assembly 60. The diameter of collar portions 55a and 55b are preferably sized to have a close alignment fit with the inside diameter of bearing assemblies 33a and 33b respectively. The sleeve 42 is a generally cylindrical tube that includes an axial bore 78 therethrough with end faces 77a and 77b. The diameter of bore 78 is preferably sized to have a press fit with the outside diameter of collar portions 55a and 55b such that the sleeve 42 and axlecaps 44a and 44b are fixedly assembled together. It is preferable that axlecaps 44a and 44b are axially locked to the sleeve 42 (by means of this press fit or by other means known in industry) such that any axial displacement therebetween is limited.

Bearing assemblies 33a and 33b are first assembled to the hub shell 20 in the conventional manner, with sleeve 42 positioned between their respective inner races. Axlecap 44a is next assembled such that collar portion 55a extends through the inside diameter of bearing 33a and to axially overlap bore 78. Similarly, axlecap 44b is assembled such that collar portion 55b extends through the inside diameter of bearing 33b to axially overlap bore 78. Holes 54a and 54b and bore 78 combine to create a continuous through opening 79 to receive the control shaft assembly 60. Bearing assemblies 33a and 33b are preferably axially sandwiched between respective shoulders 47a and 47b and end faces 77a and 77b, resulting in a solid axially abutting stack between outer faces 46a and 46b. Axlecaps 44a and 44b and sleeve 42 combine to create a sleeve assembly 49 where the opening 79 is radially stepped between a radially inward holes 54a and 54b and radially outward bore 78.

Control shaft 61 includes a shank portion 87 and an enlarged head portion 86, with a grip face 73 serving as a transition surface between the collar portion 65 and head portion 89. The shank portion 87 extends axially inwardly from the grip face 73 to the end face 99 and includes a cylindrical collar portion 65 of larger diameter 131 and a necked portion 88 that is concentric with collar portion 65 and is of smaller diameter 135 such that there is a step or transition surface 75 therebetween. The necked portion 88 may be considered as a radially relieved surface relative to the collar portion 65 and the collar portion 65 may be considered as a radially enlarged surface relative to the necked portion 88. The shank portion 87 includes end face 99 and external threads 62 at its engagement end 67. End face 99 and transition surface 75, which correspond to first and second leading engagement edges of the control shaft 61 respectively, are axially separated by engagement distance 198, which preferably corresponds to the axial distance between the outboard face 40b and the inboard face 38a. The head portion 86 extends axially outwardly from the grip face 73 and includes handle 66 having a radially projecting lever portion 45 to afford additional tightening torque and leverage when the handle 66 is manipulated by the operator in the conventional manner. Shank portion 87 includes a circumferential groove 89 axially positioned at a prescribed and predetermined axial distance between the transition surface 75 and the end face 99 that serves as an o-ring gland to receive the elastomeric o-ring 82 positioned therein. O-ring 82 is of a conventional type and is an annular elastomeric element that circumferentially circumscribes the shank portion 87 as shown.

Figure 2F:
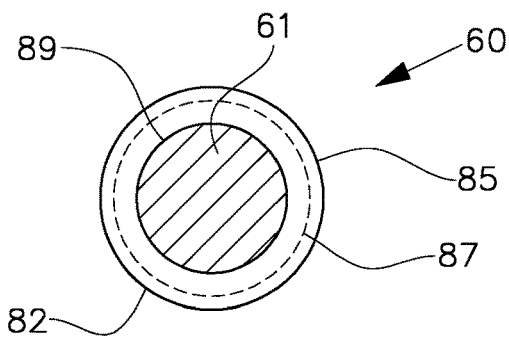
FIG. 2f is a radial cross-section view of the control shaft of the embodiment of FIG. 2a, taken along 29-29, showing the o-ring positioned within its mating groove, with the cross section of the o-ring in its relaxed and non-deformed state, corresponding to the assembly sequences shown in FIGS. 2a-d.

As shown in FIGS. 2a and 2e, the control shaft assembly 60 is completely withdrawn in the retracting direction 83 to be separated from the sleeve assembly 49. The hub assembly 30 is positioned to be axially aligned and radially offset from dropouts 32a and 32b. It may also be seen that, in the relaxed and uncompressed state shown, the radially outward peripheral surface 85 of the o-ring 83 has a diameter 81 that is radially outboard of the radially outward peripheral surface of the adjacent shank portion 87 and that is also larger in diameter 81 than the diameter 56 of the hole 54b. FIG. 2f shows the o-ring 82 as positioned in groove 89, with the perimeter surface 85 shown to be radially outboard of the shank portion 87. Peripheral surface 85 may be considered as a radially outwardly extending surface of the control shaft assembly 60. The o-ring 82, as shown in FIG. 2f is in its free and undeformed state such the cross section of the o-ring 82 is not squeezed and deformed by the hole 54b, corresponding to the positions of the control shaft assembly 60 shown in FIGS. 2a-g and FIGS. 2i-L.

Figure 2G:
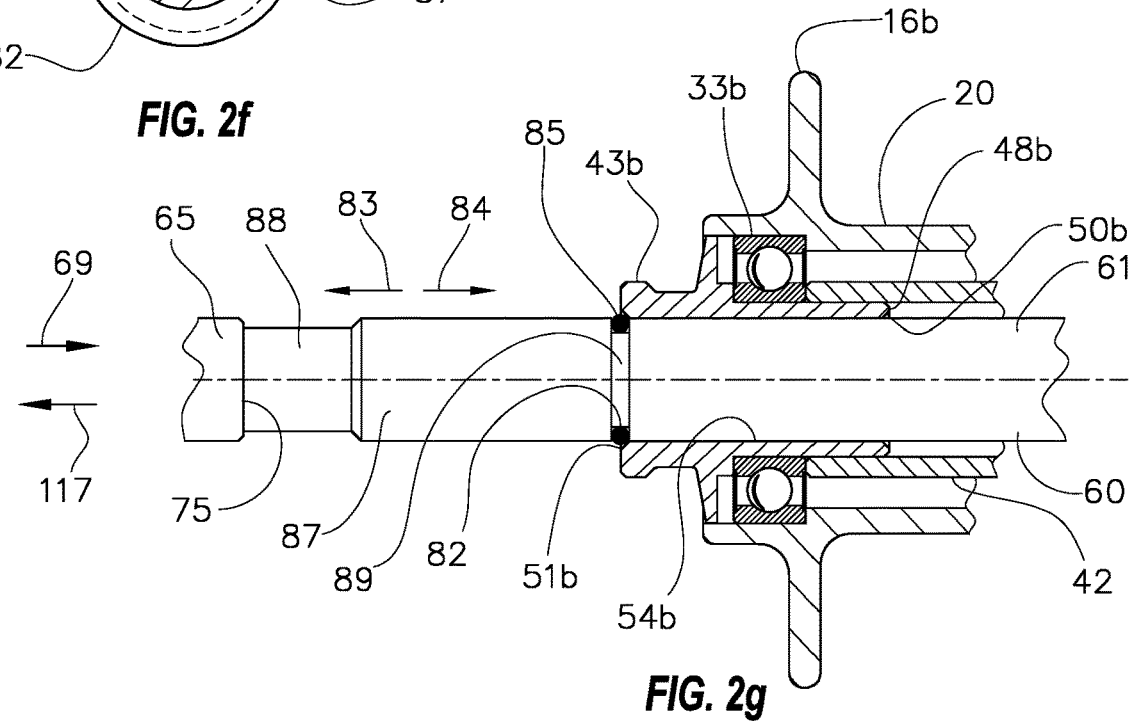
FIG. 2g is a partial axial cross-section view of the embodiment of FIG. 2a, taken along 29-29, corresponding to the transition between the assembly sequences of FIG. 2a and FIG. 2b, showing the control shaft initially inserted in the opening of the axle sleeve, with the o-ring axially abutting the chamfer of the axlecap.

As shown in FIG. 2g, the control shaft assembly 60 has next been inserted into the opening 79 in the extending direction 84 by first passing the engagement end 67 through the hole 54b until the perimeter surface 85 axially abuts the chamfer 51b. Since there is radial clearance between the shank potion 87 and the holes 54a and 54b, this insertion is free and easy and without appreciable radial binding and/or axial resistance therebetween up to this point.

Figure 2H:
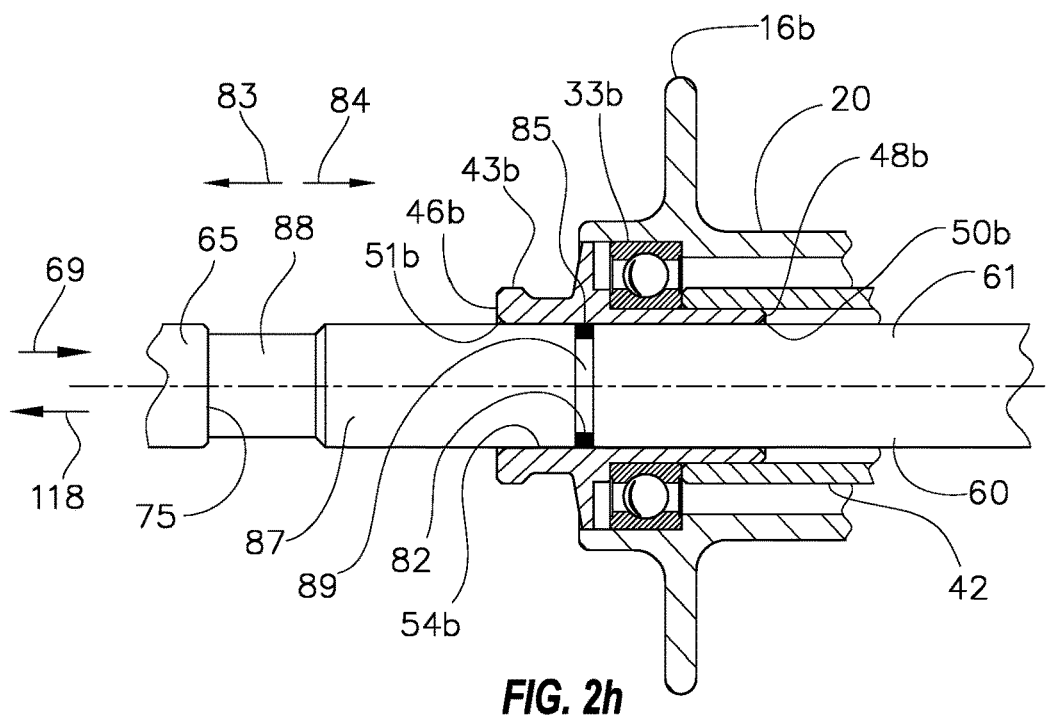
FIG. 2h is a partial axial cross-section view of the embodiment of FIG. 2a, taken along 29-29, corresponding to the transition between the assembly sequences of FIG. 2a and FIG. 2b, showing the control shaft next further inserted in the opening of the axle sleeve, with the o-ring radially deformed to axially overlap the hole of the axlecap.
Figure 2I:
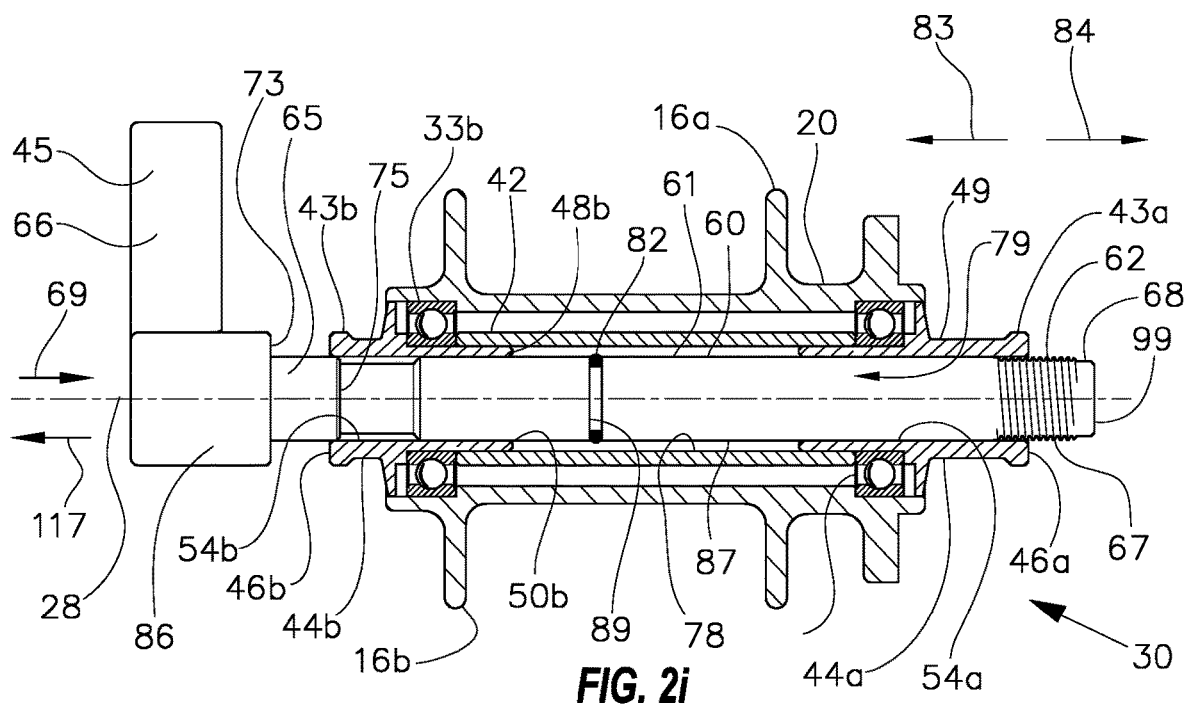
FIG. 2i is an axial cross-section view of the embodiment of FIG. 2a, taken along 29-29, corresponding to the transition between the assembly sequences of FIG. 2a and FIG. 2b, showing the control shaft further inserted in the opening of the axle sleeve, and with the o-ring axially positioned between the axlecaps.

There is a close clearance fit between the outside diameter of the shank portion 87 and the inside diameter 56 of the hole 54b and an overlie engagement between the peripheral surface 85 and the hole 54b. Thus, the o-ring 82 must next be pressed with insertion force 69 to overcome the axial restraint associated with this overlie engagement. As the control shaft assembly 60 is further pressed with considerable insertion force 69, the peripheral surface 85 is correspondingly pressed against the chamfer 51b. The funnel-shape of chamfer 51b serves to radially inwardly wedge, squeeze, and deform the o-ring 82 as it further advances in direction 84 until the diameter 81 is reduced and the radially overlying engagement between the peripheral surface 85 and hole 54b is overcome and released, allowing the o-ring 82 to pass within hole 54b. The cross section of o-ring 82 will be elastically squeezed, impinged, and deformed to radially inwardly displace and contract the peripheral surface 85 to fit through the hole 54b as shown in FIG. 2h. This elasticity of this deformation also results in an interference fit the hole 54b, resulting in certain level of frictional restraint and resistance to the axial advancement of the control shaft assembly 60 through the hole 54b. Thus, the o-ring 82 first contacts the outer face 46b and/or chamfer 51b, and then must be forcibly pressed with insertion force 69 in direction 84. Chamfer 51b serves as a funneling lead-in to radially inwardly wedge, ramp, cam, guide, and yield the peripheral surface 85 as the control shaft assembly 60 is further forcibly advanced in direction 84. This elastic deformation of the o-ring 82 results in a high degree of frictional engagement between the hole 54b and the peripheral surface 85 to restrain and impede advancement in direction 84. However, once the o-ring 82 has further advanced axially inwardly past the end face 48b, the hole 54b is no longer impinging upon the o-ring 82 and the outward peripheral surface 85 elastically springs back to its un-deformed and radially expanded diameter. The bore 78 is larger in diameter than hole 54b and preferably also larger the than outward peripheral surface 85 of the o-ring 82 such that the control shaft assembly 60 can next advance further in direction 84 freely and easily with minimal extending force 69 and with little or no radial binding or impinging friction on the o-ring 82, as shown in FIG. 2i. The control shaft assembly 60 is now both (axially) slideable and rotatable (about the axial axis 28) within the sleeve assembly 49 while the shank portion 87 is radially piloted and guided within holes 54a and 54b.

There is a fixed axial distance 52 (FIG. 2e) between the outer face 46b and the end face 48b and a fixed axial distance 53 (FIG. 2e) between the grip face 73 and the groove 89 (and corresponding o-ring 82). Distances 52 and 53 are predetermined such that the necked portion 88 will be axially aligned with the dropout 32b and the end face 99 will be axially inboard of end face 46a when the control shaft assembly 60 is in the retracted position.

Figure 2J:
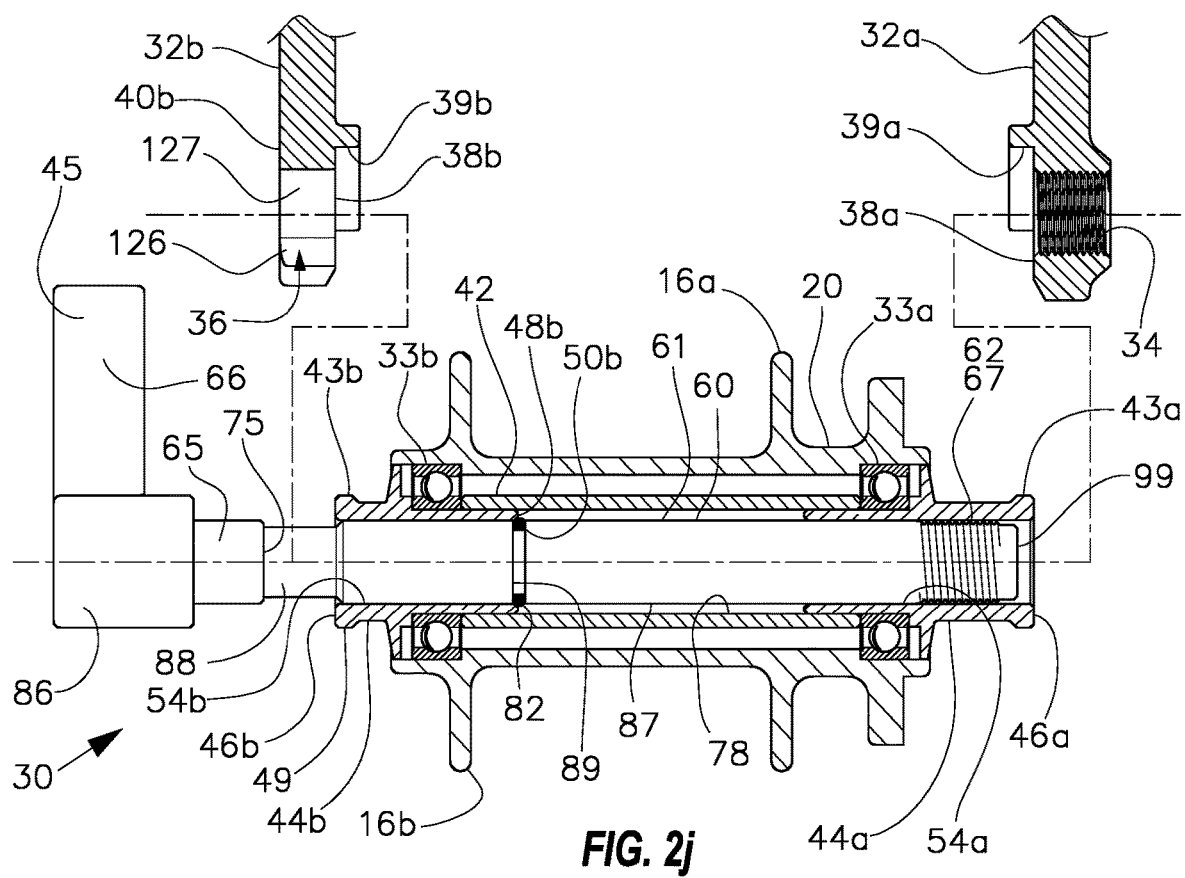
FIG. 2j is an exploded axial cross-section view of the embodiment of FIG. 2a, taken along 29-29, corresponding to the assembly sequence of FIG. 2b, with the control shaft assembled to the axle sleeve and in the retracted position, and with the hub assembly in preparation for its assembly with the dropouts.

As shown in FIGS. 2b and 2j, the control shaft assembly 60 has next been shuttled and axially displaced in direction 83 freely and easily with minimal retracting force 117 until the perimeter surface 85 contacts and axially abuts the end face 48b and/or chamfer 50b. End face 48b and chamfer 50b may be considered as radially extending surfaces of the sleeve assembly 49. At this point, due to the radially overlapping overlie engagement between the peripheral surface 85 and the hole 54b, the o-ring 82 provides resistance to further advancement in direction 83. This resistance is a pronounced stepped increase in restraint and resistance to displacement in the retracting direction 83 that occurs at the transition between the free axial travel of the control shaft assembly 60 relative to the sleeve assembly 49 (corresponding to the axial overlap of the o-ring 82 and the bore 78) and the restrained and impeded axial travel (corresponding to the axial overlap of the o-ring 82 and the hole 54b shown in FIG. 2h. This stepped increase is defined herein as a sharp and/or pronounced increase in resistance to this axial displacement that serves to provide a tactile feedback that is detectable to the operator. This stepped increase indicates to the operator that the control shaft assembly 60 is now in the axially retracted position. In this retracted position, the end face 99 is slightly axially inboard and recessed from end face 46a and the necked portion is aligned to be extending axially outboard of end face 46b. The hub assembly 30 is shown to be axially aligned and radially offset from dropouts 32a and 32b in preparation for assembly thereto.

Figure 2K:
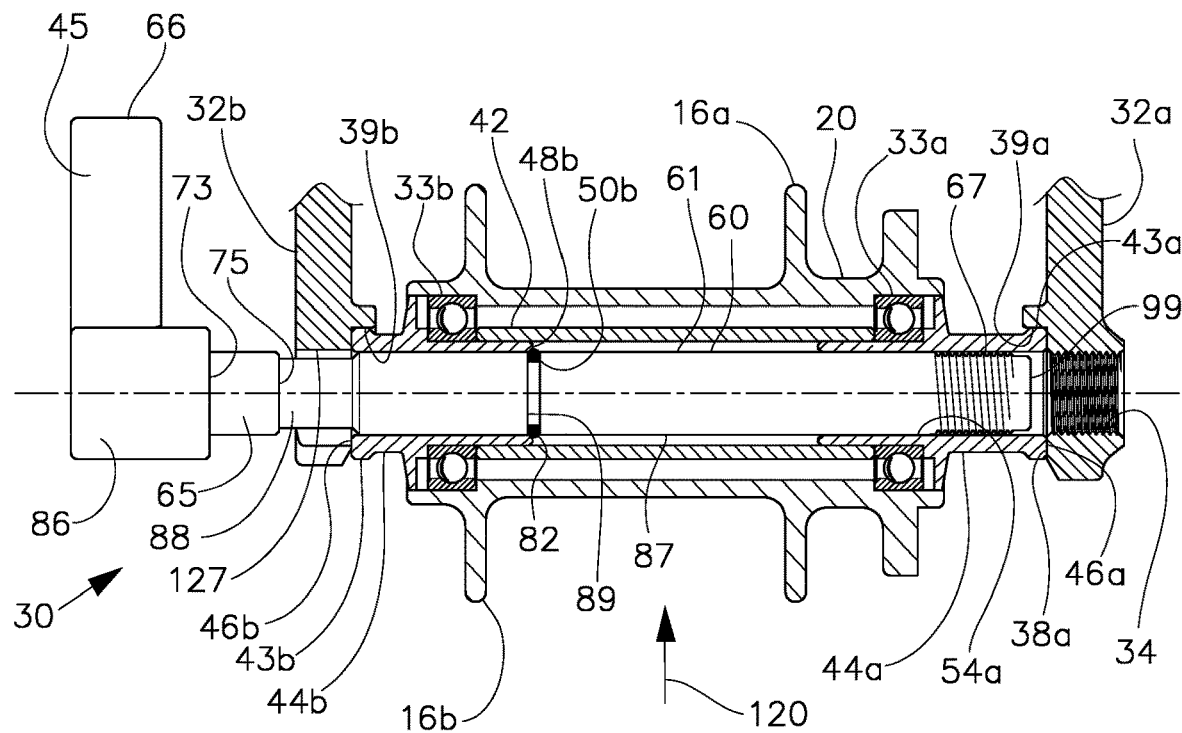
FIG. 2k is an axial cross-section view of the embodiment of FIG. 2a, taken along 29-29, corresponding to the assembly sequence of FIG. 2c, with the hub assembly as next radially pre-assembled to the dropouts, and with the control shaft still in the retracted position.

Next, as shown in FIGS. 2c and 2k, the hub assembly 30 is moved in the generally radial direction 120 relative to the dropouts 32a and 32b, with the control shaft assembly 60 still in the retracted position, such that alignment surfaces 43a and 43b are each radially abutting and nested with respective alignment surfaces 39a and 39b to provide radial alignment between the hub assembly 30 and dropouts 32a and 32b. These nested engagements serve to provide a radial positioning depth stop of the hub assembly 30 relative to the dropouts 32a and 32b in the conventional manner. Transition surface 75 is axially coincident or preferably slightly axially outboard of outboard face 40b. Necked portion 88 has passed through necked entrance region 126 such that it is now radially centered within pilot region 127. Outer face 46a is also adjoining end face 38a while outer face 46b is also adjoining inboard face 38b to provide axial alignment between the hub assembly 30 and dropouts 32a and 32b. The external threads 62 are now radially aligned with internal threaded hole 34.

Figure 2L:
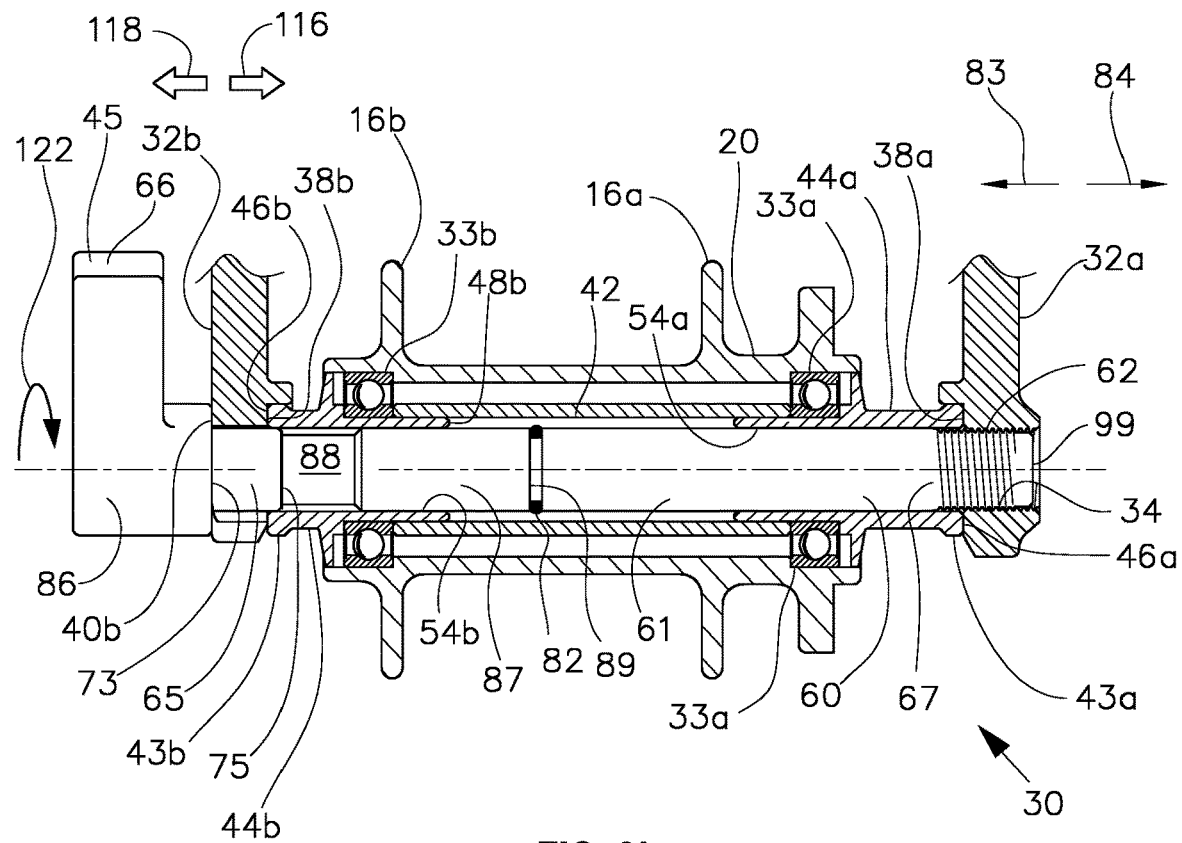
FIG. 2L is an axial cross-section view of the embodiment of FIG. 2a, taken along 29-29, corresponding to the assembly sequence of FIG. 2d, with the control shaft in the extended position such that the collar portion is axially overlapping the second dropout and the engagement end is threadably assembled to the first dropout.

Next, as shown in FIGS. 2d and 2L, the operator has next manually pressed the handle 66 in the extending direction 84 to linearly displace and shuttle the control shaft assembly 60 in direction 84 (the "extending direction") relative to sleeve assembly 49 to the point that the external threads 62 may now "catch" and be threadably engaged with internal threaded hole 34. The handle 66 is then also simultaneously manually rotated in direction 122 to threadably engage external threads 62 with internal threaded hole 34 to threadably advance the control shaft assembly 60 further in direction 84 until the grip face 73 axially presses and clamps against outboard face 40b.

Outer face 46a is now axially pressed against end face 38a and outer face 46b is also axially pressed against inboard face 38b and the control shaft assembly 60 is in the engaged position. Further threadable tightening of the handle 66 in direction 122 serves to axially draw outer face 46b toward grip face 73, thereby firmly clamping dropout 32b between grip face 73 and outer face 46b. The sleeve assembly 49 is also axially clamped between inboard faces 38a and 38b. The engagement end 67 is now fully axially overlapping the internal threaded opening 34 and the collar portion 65 is now fully axially overlapping the pilot region 127 to more positively radially retain the hub assembly 30 to the dropouts 32a and 32b. The control shaft assembly 60 is now in the "extended position" relative to the sleeve assembly 49 and dropouts 32a and 32b. With the handle 66 fully cinched and tightened as described above, the control shaft assembly 60 is now in the fully extended position relative to the sleeve assembly 49 and the hub assembly 30 is firmly clamped, installed, and assembled to the dropouts 32a ad 32b.

The procedure for uninstallation and removal of the hub assembly 30 from the dropouts 32a and 32b is basically the reverse of the assembly and installation sequence just described. For removal, the control shaft assembly 60 is first unthreaded from the internally threaded hole 34, in a direction opposite to direction 122, via handle 66, until the external threads 62 are disengaged from the internally threaded hole 34, axially displacing the control shaft assembly 60 in the retracting direction 83.

Once the threaded engagement between the external threads 62 and internal threaded hole 34 is fully unthreaded, the handle 66 may then be freely linearly retracted and axially withdrawn in the retracting direction 83 with minimal retracting force 117 until the peripheral surface 85 abuts the chamfer 50b and end face 48b and the control shaft assembly 60 is in the retracted position as shown in FIG. 2c. There is free and easy linear advancement of the control shaft assembly 60 in between the extended and retracted positions because the peripheral surface 85 is axially overlapping the bore 78 and there is little or no interference or radial impingement therebetween such that very little retracting force 117 is required by the operator.

It is noted that the peripheral surface 85 may be considered as a radially displaceable and yieldable engagement surface of the control shaft assembly 60 and chamfers 50b and 51b may be considered as a radially rigid and fixed engagement surfaces formed directly within the sleeve assembly 49. While the groove 89 may be somewhat axially wider than the o-ring 82, the axial clearance therebetween preferably does not result in appreciable axial displacement therebetween and the axial location of the peripheral surface 85 is generally axially fixed relative to the shank portion 87. Also, the chamfer 50b is axially fixed relative to outboard face 40b and to the sleeve assembly 49. When the peripheral surface 85 is in its radially outwardly expanded and free state as shown in FIGS. 2g, 2i, and 2j, this is considered an engaged orientation of the peripheral surface 85. When the peripheral surface 85 is in its radially inwardly contracted and impinged state as shown in FIG. 2h, this is considered a released orientation of the peripheral surface 85. The retracted position corresponds to an axially abutting and radially overlapping overlie engagement between the peripheral surface 85 (in its engaged orientation) and the chamfer 50b. The released orientation corresponds to the yielding or elimination of this overlie engagement as shown in FIG. 2h. It is noted that, in these embodiments, the overlie engagement is achieved irrespective of the circumferential orientation of the control shaft assembly 60 relative to the sleeve assembly 49.

Once the control shaft assembly 60 has been displaced in the retracting direction 83 to the retracted position, the o-ring 82 provides a stepped resistance and restraint against further advancement in direction 83, which serves to provide a tactile feedback to the operator indicating that the control shaft assembly 60 is again in the axially retracted position as shown in FIG. 2c. The retracted position also corresponds to the transition between the free axial displacement of the o-ring 82 within the bore 78 (corresponding to retracting force 117 shown in FIG. 2i) and the frictionally restrained and impinged axial displacement of the o-ring 82 within the hole 54b (corresponding to the extraction and withdrawal force 118 shown in FIG. 2h). This impingement and restraint also serves to retain the control shaft assembly 60 with the sleeve assembly 49 to restrain and resist the inadvertent separation between the two.

This tactile feedback lets the operator know that the retracted position has been achieved such that the end face 99 is recessed from outer face 46a and the necked portion 88 is axially aligned with the necked entrance region 126 such that engagement end 67 is no longer axially overlapping the internal threaded hole 34 and collar portion 65 is no longer axially overlapping the pilot region 127. The o-ring 82 serves as a restraining element of the control shaft assembly 60 that provides a radially overlapping overlie engagement and also a frictional engagement with the sleeve assembly 49 to restrain axial displacement therebetween.

The hub assembly 30 may now be radially disassembled and removed from the dropouts 32a and 32b in a direction opposite to direction 120 as shown in FIG. 2b. It is noted that the control shaft assembly 60 need not be completely withdrawn in the retracting direction 83 (as shown in FIG. 2a, for example) in order to remove the hub assembly 30 and control shaft assembly 60 from the dropouts 32a and 32b. The hub assembly 30 may later be assembled to the dropouts 32a and 32b in the procedure previously described in FIG. 2j-L. Thus the tactile feedback provided by the o-ring 82 serves as an aid to the operator in detecting the retracted position during both the disassembly and assembly procedures described hereinabove.

In the case where the operator would like to completely withdraw and remove the control shaft assembly 60 from the sleeve assembly 49, the operator may forcibly withdraw the control shaft assembly 60 further in direction 83 with a stepped and incrementally greater extraction and withdrawal force 118 sufficient to overcome and yield the interference fit and radial overlie engagement between the o-ring 82 and the chamfer 50b. Like the lead-in provided by chamfer 51b as described hereinabove, chamfer 50b also serves as a funneling lead-in to radially inwardly wedge, ramp, cam, and guide the peripheral surface 85 to elastically deform the cross section of the o-ring 82 as the control shaft assembly 60 is advanced in direction 83 until the o-ring 82 is again in its released orientation. The control shaft assembly 60 may now advance further in direction 83 as shown in FIG. 2h. This elastic radial deformation of the o-ring 82 also results in a high degree of frictional wiping engagement between the hole 54b and the peripheral surface 85 to impede and resist advancement in direction 83 as shown in FIG. 2h. The peripheral surface 85 may be considered as a passively yieldable engagement surface since it is not directly operated upon and is instead simply yielded by the withdrawal force 118 applied to the control shaft assembly 60.

It is understood that the axial taper of chamfer 50b (and also of chamfer 51b) provides a comparatively gentle squeezing deformation of the o-ring 82, which may prevent damage to the softer elastomeric o-ring 82 material. In contrast, if a square shoulder were substituted for chamfers 50b and 51b, the corresponding sharp edge may tend to shear and damage the o-ring 82 material.

Once the o-ring 82 has advanced axially outwardly past the end face 46b and/or chamfer 51b (as shown in FIG. 2g), the hole 54b is no longer impinging upon and restraining the o-ring 82 and the outward peripheral surface 85 elastically springs back to its un-deformed and radially expanded diameter. The control shaft assembly 60 can now freely advance further in direction 83 until the control shaft assembly 60 is completely withdrawn and separated from the remainder of the hub assembly 30 as shown in FIGS. 2a and 2e.

Figure 3A:
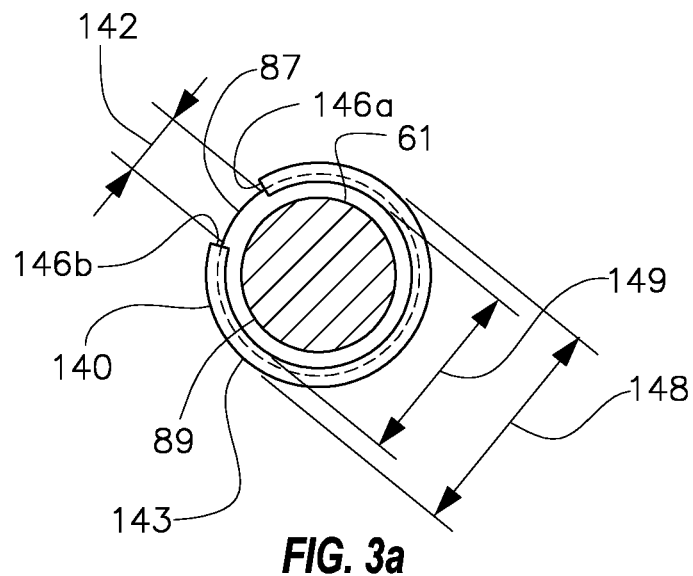
FIG. 3a is a radial cross-section view of a second embodiment of the present invention, taken along 124-124, corresponding to the embodiment of FIG. 2a, showing the control shaft of the embodiment of FIG. 2a with a split ring alternatively substituted for the o-ring and positioned within its mating groove.

The o-ring 82 of FIG. 2a-L serves as an elastically deformable element with a radially yieldable peripheral surface 85 that serves to provide an axially yieldable engagement between the control shaft assembly 60 and the sleeve assembly 49 at a given axial position therebetween. O-ring 82 is an example of a radially yieldable element whereby its cross section may be elastically distorted to provide this radially yieldable surface. However, it is envisioned that a wide range of alternate means may be substituted for the o-ring 82 to provide a similarly radially yieldable surface and a similar axial engagement. For example, FIG. 3a shows a radially yieldable split ring 140 with a peripheral surface 143 and a circumferential gap 142 between ends 146a and 146b. This split ring 140 is preferably made of a harder spring-like material such as stainless steel wire and may be substituted for the o-ring 82 of FIG. 2a-L. In its free and relaxed state, the split ring 140 is axially retained in groove 89 and has an outside diameter 148 that is larger than the diameter 56 of the hole 54b and an inside diameter 149 that is larger than the root diameter of the groove 89 and smaller than the outside diameter of the shank portion 87.

When the split ring 140 is forced to axially overlap within the hole 54b, corresponding to the transition between FIG. 2g and FIG. 2h and/or between FIGS. 2j and 2h, the hole 54b and chamfers 50b and/or 51b bear against peripheral surface 143 to force the split ring 140 to be radially inwardly yielded and displaced to be able to pass axially within hole 54b. This also causes the split ring 140 to elastically and circumferentially contract, squeezing and reducing the outside diameter 148 and correspondingly reducing the gap 142, allowing it to pass axially through the hole 54b, thereby providing a similar tactile feedback to the operator as described hereinabove. The peripheral surface 143 corresponds to peripheral surface 85 and the split ring 140 serves as a restraining element of the control shaft assembly 60 that provides a linear detent and/or frictional engagement with the sleeve assembly 49 to restrain axial displacement therebetween.

Figure 3B:
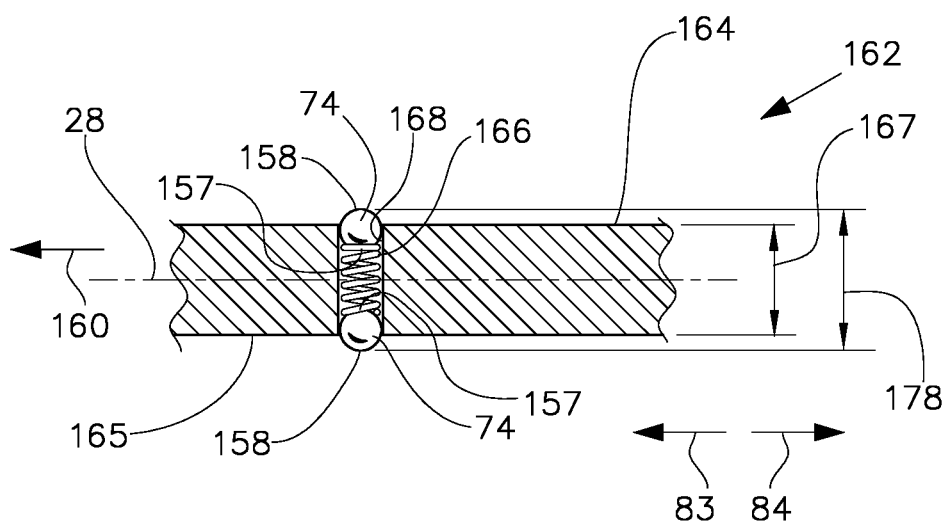
FIG. 3b is an axial cross-section view of a third embodiment of the present invention, corresponding to the embodiment of FIG. 2a, showing an alternate control shaft of the embodiment of FIG. 2a, with detent balls alternatively substituted for the o-ring, with a compression spring to energize and bias the balls and a cross-hole to house the balls and spring.

FIG. 3b describes an alternative embodiment where the o-ring 82 is omitted in favor of detent balls 74 to provide a radially yieldable surface that is axially retained to the control shaft 164. In contrast to the o-ring 82, which has a yieldable cross section, the detent balls 74 are rigid elements that provide the radially outboard peripheral surface 158, while the compression spring 166 serves to provide a yieldable element to bias the detent balls 74 in the radially outward direction. In FIG. 3b, control shaft assembly 162 includes a control shaft 164 having a shank portion 165 with a cross hole 168 that houses detent balls 74 with a compression spring 166 therebetween. Spring 166 is positioned between detent balls 74 such that their radially inboard spherical peripheries 157 each contact the opposing ends of spring 166 and their radially outboard peripheries 158 may have contact with the hole 54b and/or chamfer 50b. The detent balls 74 are axially retained to the control shaft 164 within cross hole 168. Spring 166 serves to energize, preload, and bias detent balls 74 toward a radially outward orientation.

The radial distance 178 between radially opposing outboard peripheries 158 is larger than the radial diameter 167 of the shank portion 165 and larger than the diameter 56 of hole 54b such that, in the retracted position of the control shaft 164, the outboard peripheries 158 project radially outwardly from shank portion 165 to radially overlie and axially engage the chamfer 50b to provide a tactile feedback to the operator that this retracted position has been achieved. Peripheries 158 are considered as radially outwardly extending surfaces of the control shaft assembly 161 that are also radially displaceable. This overlie engagement also serves to restrain the control shaft 164 from further advancing in direction 83 to become separated from the sleeve assembly 49 (not shown). If the operator desires to withdraw the control shaft 164 completely from the sleeve assembly 49, the operator may apply a large retracting force 160 to overcome the linear detent whereby the chamfer 50b may cam against the detent balls 74, causing the detent balls 74 to be displaced radially inwardly and compress the compression spring 66. As such, the radial overlie between the balls 74 and hole 54b is eliminated and the control shaft 164 may be further advanced in direction 83 to withdraw and separate the control shaft assembly 162 from the remainder of the sleeve assembly 49. As such, it is seen that, like the o-ring 82 of FIG. 2a-L, the radially opposing detent balls 74 and spring 166 serve to provide a radially yieldable restraining means to retain the control shaft assembly 162 with the sleeve assembly 49.

It is noted that the embodiments of FIGS. 2a-L, 3a, 3b, 4a-f, and 5a-e all describe yieldable axial retaining and restraining means that may be yielded or overridden by simply pushing the control shaft in a direction generally parallel to the axial axis 28. These restraining means may be considered as passive restraining means since the operator merely needs to axially displace the control shaft in the desired direction of axial travel to override and release the restraining means. No additional activation is required by the operator of this mechanism. As an alternative to such a passive axial retaining system, it is possible to employ an active axial restraining system where the operator must separately activate and release the overlie engagement and corresponding axial restraining means. An example of such an active axial restraining system is described in the embodiment of FIGS. 3c-d, which employs a lockable or latching axial restraining means where the operator must separately press the pushbutton 208 in order to actively release the restraining means.

It is further noted that the retaining systems of FIGS. 2a-L, 3a-b, 4a-b, 5a-b, and 6a-b are considered to have a yieldable restraining means since the restraining means may be yielded or overridden by axially pressing the control shaft to overcome the axial restraining force provided by the restraining means. This is in contrast to a positive or locking axial restraining means where the control shaft is positively engaged to the sleeve assembly and the restraining means may not be overridden in normal use. An example of such positive axial retaining means is shown in FIGS. 3c-d, where the locking pin 205 serves to lockably engage the engagement balls 214 to positively maintain the overlie engagement and prevent the control shaft 201 from axially advancing in direction 83 past the chamfer 50b.

As shown in FIG. 3c, which corresponds to the assembly sequence of FIG. 2e, control shaft 200 constitutes an assembly that includes an external shaft 201, a locking pin 205, a spring 216, and engagement balls 214. External shaft 201 has a shank portion 203 that includes a necked portion 207 and radially extending cross holes 202 and an axially extending central bore 204 with bottom 206. Cylindrical locking pin 205 extends within bore 204 and includes a pushbutton 208, end face 213, and a circumferential groove or necked region 210 that separates shank portions 212a and 212b. Spring 216 extends between bottom 206 and end face 213 and serves to bias the locking pin 205 in direction 229 relative to the external shaft 201. Engagement balls 214 function in a manner similar to detent balls 74 of FIG. 3b and include a radial inboard periphery 218 and a radial outboard periphery 219 and are positioned within their associated cross holes 202. Sleeve assembly 49, hub shell 20, and bearings 33a and 33b are identical to those described in FIG. 2a-L.

Engagement balls 214 are positioned within corresponding holes 202, with their radially inboard periphery 218 contacting the shank portion 212a and with their radially outboard periphery 219 having radial clearance with bore 78. The engagement balls 214 are axially retained to the external shaft 201 by holes 202, and the shank portion 212a provides a blocking engagement to prevent engagement balls 214 from moving radially inwardly. Engagement balls 214 are shown in FIG. 3c to be radially outwardly extended to protrude and project from shank portion 203. This is considered a locked or engaged orientation of the control shaft 200, with the distance 220 across opposing outboard peripheries 219 being larger than the diameter 221 of shank portion 203 and the diameter 56 of hole 54b.

Next, as shown in FIG. 3d, the operator has actively depressed pushbutton 208, advancing locking pin 205 in direction 228 relative to the external shaft 201, and compressing spring 216 such that necked portion 210 is now axially aligned with holes 202, which releases engagement balls 214 to move radially inwardly as shown. This is considered a released orientation of the control shaft 200 where the engagement balls 214 are radially inwardly retracted. FIG. 3d corresponds to the assembly sequence of FIG. 2h. With engagement balls 214 now positioned radially inwardly, distance 220' across outboard peripheries 219 is now reduced and preferably equal to the diameter 221 of the external shaft 201 to have radial clearance with hole 54b and the control shaft 200 is now released to advanced in direction 83 and/or 84, with engagement balls 214 passing through hole 54b The basic engage/release mechanism of control shaft 200 schematically described in FIGS. 3c-d is representative of a "quick release pin" that is commercially available in industry.

The assembly procedure is achieved as follows. With the pushbutton 208 released, the spring 216 pushes the locking pin in direction 229 to again lock the control shaft 200 in the engaged orientation as shown in FIG. 3c. The control shaft 200 is then inserted within opening 79 in direction 84 until the engagement balls 271 outboard peripheries 219 axially abut the chamfer 51b, corresponding to the assembly sequence of FIG. 2g. Next, the operator actively depresses the pushbutton 208 in direction 228 to place the control shaft 200 in the released orientation with the engagement balls 214 radially inwardly retracted. The control shaft 200 may now advance further in direction 84, with engagement balls 214 passing through hole 54b. Next, when the engagement balls 214 have advanced past the end face 48b, the operator actively releases the pushbutton 208 and the spring 216 pushes the locking pin 205 in direction 229, returning the control shaft 200 to the engaged orientation, corresponding to the assembly sequence of FIG. 2i. Next, the operator withdraws the control shaft 200 in direction 83 until the outboard peripheries 219 axially abut the chamfer 50b. The control shaft assembly 200 is prevented from further advancing in direction 83, providing tactile feedback to the operator that the control shaft 200 is now in the retracted position corresponding to the assembly sequence of FIG. 2j. Since the engagement balls 214 are radially locked by the shank portion 212a, the control shaft 200 is axially locked from advancing further in direction 83 relative to sleeve assembly 49. The hub assembly 30 may now be radially assembled to the dropouts 32a and 32b, corresponding to the assembly sequence of FIG. 2k. The control shaft 200 may then be assembled and secured to the dropouts 32a and 32b in the manner corresponding to the assembly sequence of FIG. 2L.

The procedure to disassemble the hub assembly from the dropouts 32a and 32b is the reverse of the assembly procedure just described. However, if the operator desires to completely remove and withdraw the control shaft 200 from the sleeve assembly 49, the operator must actively depress the pushbutton 208 in direction 208 to place the control shaft 200 in the released orientation in order to withdraw the engagement balls 214 past the hole 54b in direction 83.

Figure 4A:
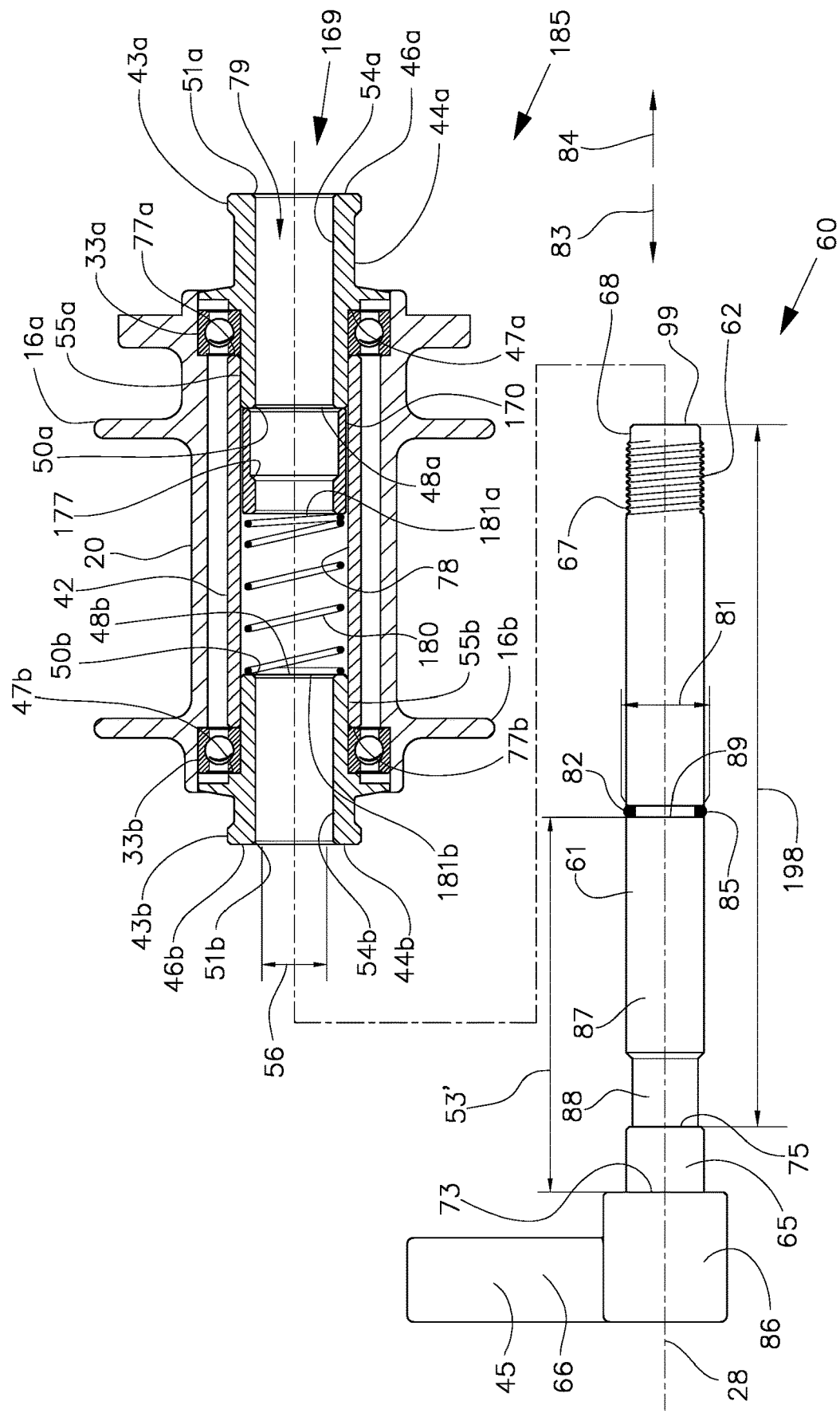
FIG. 4a is an axial cross section exploded view of a fifth embodiment of the present invention, showing the control shaft assembly prior to its assembly with the remainder of the hub assembly.

The embodiment of FIGS. 4a-f is similar to the embodiment of FIG. 2a-L, except that the sleeve assembly 169 of FIGS. 4a-f includes a compression spring 180 and a collar 170 and the control shaft assembly 60 is axially restrained to sleeve assembly 169 by means of the collar 170. FIG. 4a is an exploded view, showing the control shaft assembly 60 prior to its assembly with the sleeve assembly 169 and with the hub assembly 30 prior to its assembly with the dropouts 32a and 32b.

Referring to FIGS. 4a-f, dropouts 32a (left dropout) and 32b (right dropout), axlecaps 44a and 44b, sleeve 42, bearing assemblies 33a and 33b, and hub shell 20 are identical to those described in FIG. 2a-L. Control shaft assembly 60 is identical to that described in FIG. 2a-L, however, the axial distance 53' between grip face 73 and groove 89 has been lengthened to accommodate the axial widths of compression spring 180 and collar 170. Sleeve assembly 169 includes axlecaps 44a and 44b, sleeve 42, compression spring 180, and collar 170. Compression spring 180 is of generally conventional configuration as a coil of wire and includes ends 181a and 181b and has a radial inside diameter slightly larger than the diameter of the peripheral surface 85 and a radial outside diameter slightly smaller than the inside diameter of the bore 78 of sleeve 42. Collar 170 is detailed in FIG. 4f and is a generally circular cylindrical element that includes end faces 172a and 172b, an axially extending opening 175, and chamfer 176. The inside diameter of opening 175 is stepped to include: bore 173 having a diameter 179 preferably sized to be slightly smaller than diameter 56 of hole 54b and to have radial clearance with the outside diameter of shank portion 87; bore 174 with a diameter 182 that is larger than bore 173 and shown here to be sized to have a diameter slightly larger than the diameter 81 of peripheral surface 85; and a conical stepped transition surface 177 that extends radially between bore s 173 and 174.

Hub assembly 185 is assembled as shown in FIG. 4a and includes sleeve assembly 169, bearing assemblies 33a and 33b, and hubshell 20. As shown in FIG. 4a, collar 170 and compression spring 180 are positioned between end faces 48a and 48b. Compression spring 180 is preferably slightly compressed and axially pre-loaded from its relaxed state such that end face 181b axially abuts end face 48b of axlecap 44b and end face 181a axially abuts end face 172b of collar 170. End face 172a of collar 170 is axially abutting end face 48a of axlecap 44a. Collar 170 is axially preloaded in direction 84 by compression spring 180. As shown in FIG. 4a, the control shaft assembly 60 is completely withdrawn in the retracting direction 83 to be separated from the sleeve assembly 169.

Figure 4B:
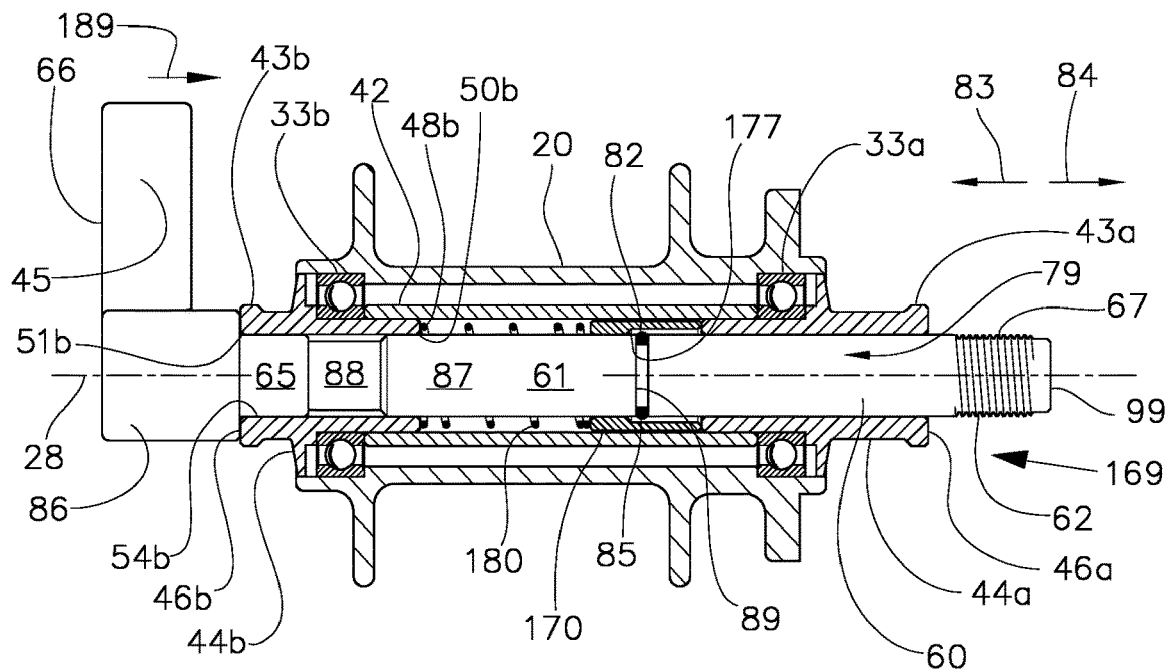
FIG. 4b is an axial cross section view of the embodiment of FIG. 4a, showing the control shaft assembly as next assembled within the opening of the axle sleeve assembly, the spring, and the opening of the collar.

As shown in FIG. 4b, the control shaft assembly 60 has first been inserted into the sleeve assembly 169 in direction 84 to extend within opening 79 and opening 175 such that o-ring 82 is positioned axially past the transition surface 177 in direction 84 as shown. Hole 54b and bore 173 are shown here as having generally identical diameters 56 and 179 respectively.

In order to achieve this insertion shown in FIG. 4b, control shaft assembly 60 must be pressed with force 189 so that the o-ring 82 can be radially compressed as it squeezes through hole 54b to override the interference therebetween as previously described in FIG. 2h. The control shaft assembly 60 advances through spring 170 and then must also be similarly radially compressed as it squeezes through bore 173, with chamfer 176 serving as a funneling lead-in in a manner similar to chamfer 51b. It is envisioned that the diameter 56 may alternatively be slightly larger than bore 173 such that o-ring 82 may be squeezed through hole 54b with a lower insertion and assembly force 189 than that the assembly force 189 required to squeeze through bore 173. Once the o-ring 82 has advanced in direction 84 past the transition surface 177, the bore 173 is no longer squeezing and impinging upon the o-ring 82 and the outward peripheral surface 85 elastically springs back to its un-deformed and radially expanded diameter 81. The diameter 182 of bore 174 is larger than diameter 179 and preferably larger the than the diameter 81 of peripheral surface 85 of the o-ring 83. The control shaft assembly 60 is shown here to be extended in direction 84 beyond the extended position to a hyper-extended position relative to the sleeve assembly 169.

Figure 4C:
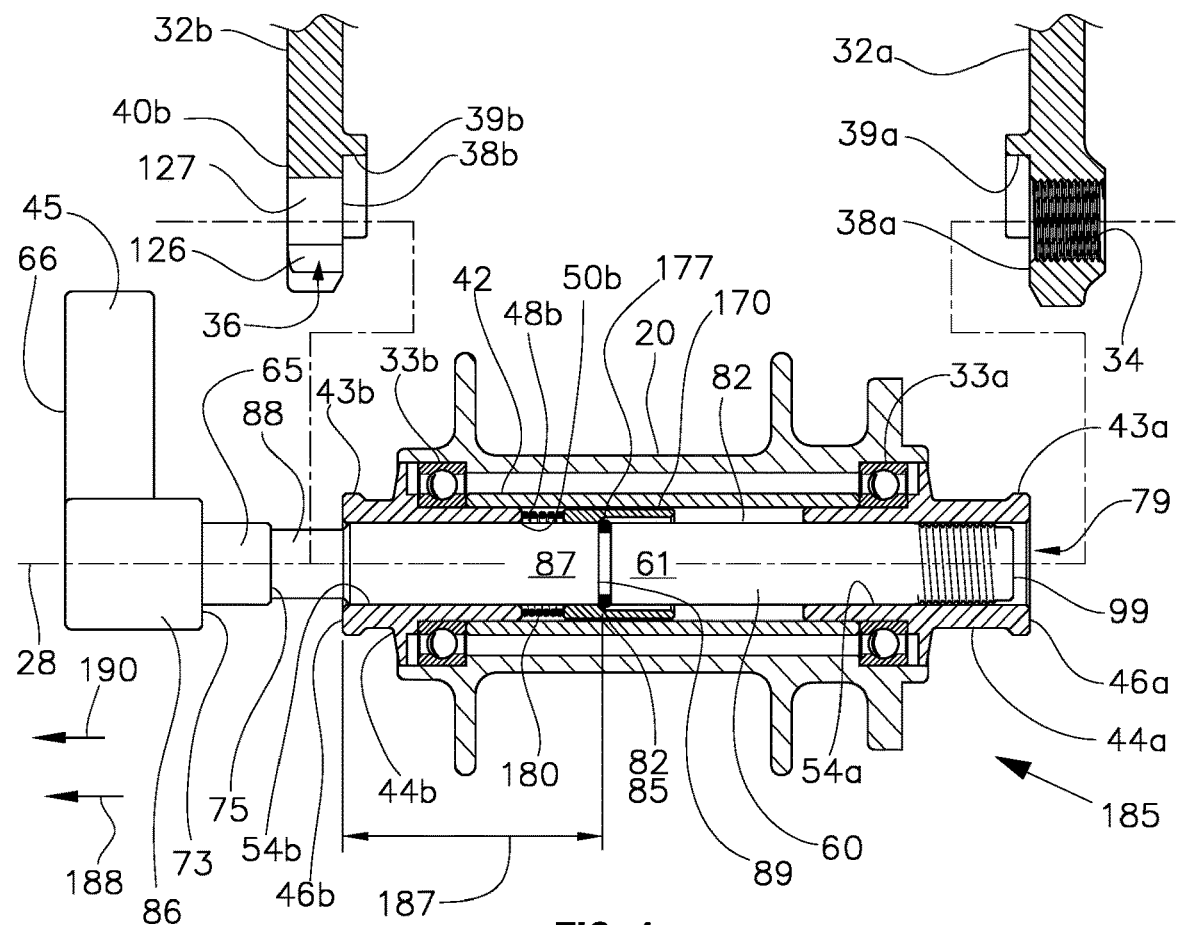
FIG. 4c is an axial cross section view of the embodiment of FIG. 4a, showing the control shaft assembly as next placed in the retracted position in preparation for assembly with the dropouts.

There is now a radially overlapping overlie engagement between bore 173 and peripheral surface 85 such that, when the operator next withdraws the control shaft assembly 60 in direction 83, the peripheral surface 85 axially abuts the transition surface 177, causing the collar 170 to also displace in direction 83 as well. As shown in FIG. 4c, the operator has pulled on the handle 66 with retracting force 188 to overcome the axial preload provided by the spring 180 and to displace the control shaft assembly 60 in direction 83 to the retracted position. Since the peripheral surface 85 radially overlies the bore 173 and transition surface 177, the o-ring 82 is axially engaged to the collar 170 and this retracting displacement of the control shaft assembly 60 serves to correspondingly axially displace the collar 170. This retracting displacement of the collar 170 causes the compression spring 180 to be further axially compressed until it has reached its solid height as shown in FIG. 4c. The control shaft assembly 60 is now in its fully retracted position with the end face 99 flush or recessed relative to end face 46a and necked portion 88 extending axially outward from end face 46b.

The axial distance 187 between the outer face 46b and the transition surface 177 is comprised of the sum of the axial width between outer face 46b and end face 48b, the axial width between end face 172b and transition surface 177, and the solid height of the spring 180. Since the coils of spring 180 abut each other at the solid height, there is now a solid axially abutting stack between the axlecap 44b, the spring 180, and the collar 170. There is also a fixed axial distance 53' between the grip face 73 and the groove 89 (and corresponding o-ring 82). Distances 187 and 53' are predetermined such that, when the control shaft assembly 60 is in this retracted position shown in FIG. 4c, the necked portion 88 will be axially aligned with the dropout 32b and the end face 99 will be axially recessed relative to end face 46a.

In the transition between FIGS. 4b and 4c, the resistance to axial displacement of the control shaft assembly 61 in direction 83 corresponds primarily to the axial preload provided by the spring 180. At the fully retracted position of the control shaft assembly 61 shown in FIG. 4c, the radial overlying restraining engagement between the o-ring 82 and transition surface 177 provides a pronounced stepped increase in restraint and resistance to further advancement in direction 83. This stepped increase serves to provide a tactile feedback that is detectable to the operator, indicating that the control shaft assembly 60 is in the axially retracted position and no further axial displacement is needed. The hub assembly 185 is shown in FIG. 4c to be axially aligned and radially offset from dropouts 32a and 32b in preparation for assembly thereto.

Next, the hub assembly 185 is moved in the generally radial direction 120 relative to the dropouts 32a and 32b while the control shaft assembly 60 is still in the retracted position, in a manner similar to that described in FIG. 2k, such that alignment surface 43a is radially abutting and nested with alignment surface 39a and alignment surface 43b is radially abutting and nested with alignment surface 39b to provide radial alignment between the hub assembly 185 and dropouts 32a and 32b. Necked portion 88 has passed through necked entrance region 126 such that it is now radially centered within pilot region 127. Outer face 46a is also adjoining inboard face 38a while outer face 46b is also adjoining inboard face 38b to provide axial alignment between the hub assembly 185 and dropouts 32a and 32b.

Figure 4D:
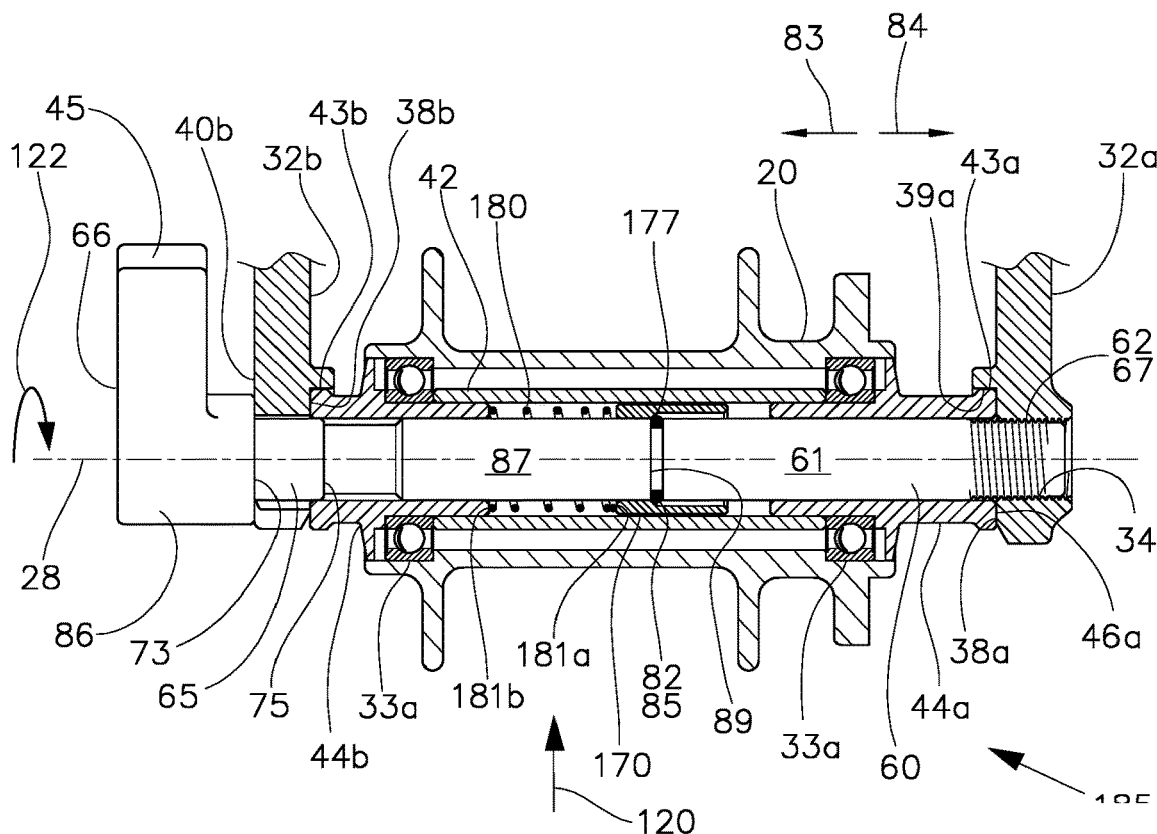
FIG. 4d is an axial cross section view of the embodiment of FIG. 4a, showing the hub assembly radially as next assembled to the dropouts, with the control shaft assembly in the extended position and threadably assembled to the right dropout to secure the hub assembly to the dropouts.
Figure 4E:
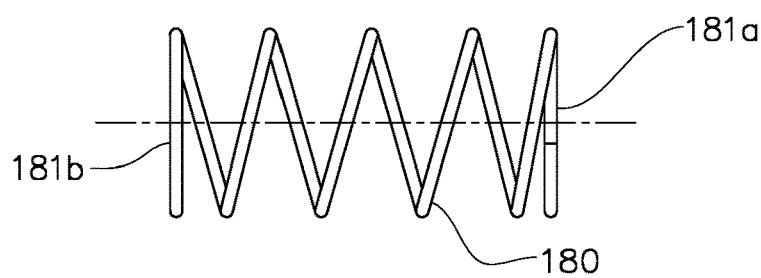
Figure 4F:
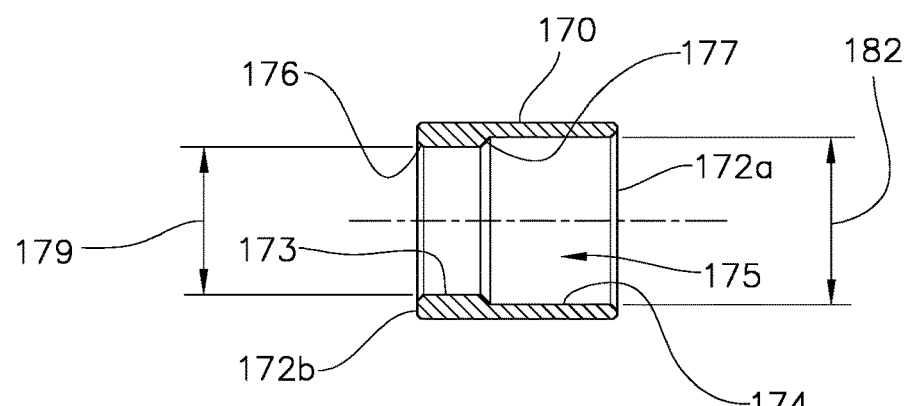

Next, as shown in FIG. 4d, the operator has then manually released the handle 66 such that the axial preload provided by the spring 180 has linearly displaced and shuttled the collar 170 and control shaft assembly 60 in the extending direction 84 to the point that the external threads 62 may now "catch" and be threadably engaged with internal threaded hole 34. The handle 66 is then also simultaneously manually rotated in direction 122 to threadably engage external threads 62 with internal threaded hole 34 to threadably advance the control shaft assembly 60 in direction 84 until the grip face 73 axially presses and clamps outboard face 40b. The control shaft assembly 60 is now in the extended position and the control shaft assembly 60, sleeve assembly 169, and hub assembly 185 are now firmly assembled and clamped to the dropouts 32a and 32b as similarly described in FIGS. 2d and 2L.

In comparison to the embodiment of FIG. 2a-L, the spring 180 in the assembly of FIGS. 4a-g serves to axially bias the control shaft assembly 60 in direction 84 toward the extended position. This is a convenience for the operator, since now the operator needs only to release the handle 66 and the spring 180 will axially shuttle the control shaft assembly 60 without further operator input. This axial bias also serves to maintain the axial overlie between collar portion 64 and pilot region 127 and the axial overlie between pilot tip 68 and threaded hole 34 prior to threadable tightening in direction 122. This provides additional safety by preventing inadvertent separation of the control shaft assembly 60 and the dropouts 32a and 32b before this threadable tightening or if this threaded engagement were to become inadvertently threadably loosened.

The procedure for uninstallation and removal of the control shaft assembly 60 and hub assembly 185 from the dropouts 32a and 32b is basically the reverse of the assembly and installation sequence just described. For removal, the control shaft assembly 60 is first unthreaded from the internally threaded hole 34, in a direction opposite to direction 122, via handle 66, until the external threads 62 are disengaged from the internally threaded hole 34, axially displacing the control shaft assembly 60 in the retracting direction 83.

Once the threaded engagement between the external threads 62 and internal threaded hole 34 is fully unthreaded, the handle 66 may then be pulled in direction 83 and axially withdrawn in the retracting direction 83 with retracting force 188 until the control shaft assembly 60 is fully retracted and the spring 180 achieves its solid height as shown in FIG. 4c. In this retracted position, the overlie engagement between transition surface 177 and peripheral surface 85 provides a stepped increase in resistance and restraint against further advancement in direction 83, which serves to provide a tactile feedback to the operator indicating that the control shaft assembly 60 is again in the axially retracted position as shown in FIG. 4c. The retracted position also corresponds to the transition between the spring-biased axial displacement of the control shaft assembly 60 and the frictionally impinged axial displacement of the o-ring 82 within the bore 173. The relationship between the retracted position and the dropouts 32a and 32b are also described in FIG. 2a-L. The hub assembly 185 may now be radially disassembled and removed from the dropouts 32a and 32b as shown in FIG. 4c. Thus the tactile feedback provided by the o-ring 82 serves as an aid to the operator in detecting the retracted position during both the disassembly and assembly procedures described hereinabove.

In the case where the operator would like to completely withdraw and remove the control shaft assembly 60 from the sleeve assembly 49, the operator may then forcibly withdraw the control shaft assembly 60 further in direction 83 with an extraction force 190 greater that is incrementally greater than the retracting force 188 (associated with the preload of spring 180 at its solid height) and is sufficient to overpower and defeat the radially overlying engagement between the o-ring 82 and the transition surface 177. Transition surface 177 serves as a funneling lead-in to wedge, cam, guide, and radially yield and displace the peripheral surface 85 radially inwardly to deform the cross section of the o-ring 82 in a manner similar to that described in FIG. 2h. This elastic deformation of the o-ring 82 results in a high degree of frictional wiping engagement between the bore 173 and the peripheral surface 85 to impede and resist its advancement in direction 83. However, once the o-ring 82 has advanced axially outwardly past the end face 172b, the bore 173 is no longer impinging upon the o-ring 82 and the outward peripheral surface 85 elastically springs back to its un-deformed and radially expanded diameter. The control shaft assembly 60 is then advanced further in direction 83 until the o-ring 82 contacts the chamfer 50b. The control shaft assembly 60 (with o-ring 82) is then extracted through the hole 54b and fully withdrawn from the sleeve assembly 169 in a manner similar to that described in FIG. 2a-L. The control shaft assembly 60 is completely withdrawn and separated from the remainder of the hub assembly 185 as shown in FIG. 4a.

The embodiment of FIGS. 5a-d is similar to the embodiment of FIG. 2a-L, except that the engagement between the control shaft assembly and sleeve assembly is transposed such that the sleeve assembly 249 includes the radially displaceable and yieldable element (i.e. o-ring 282) and the control shaft assembly 260 includes a radially rigid and fixed engagement surface (i.e. transition surface 263d).

Figure 5A:
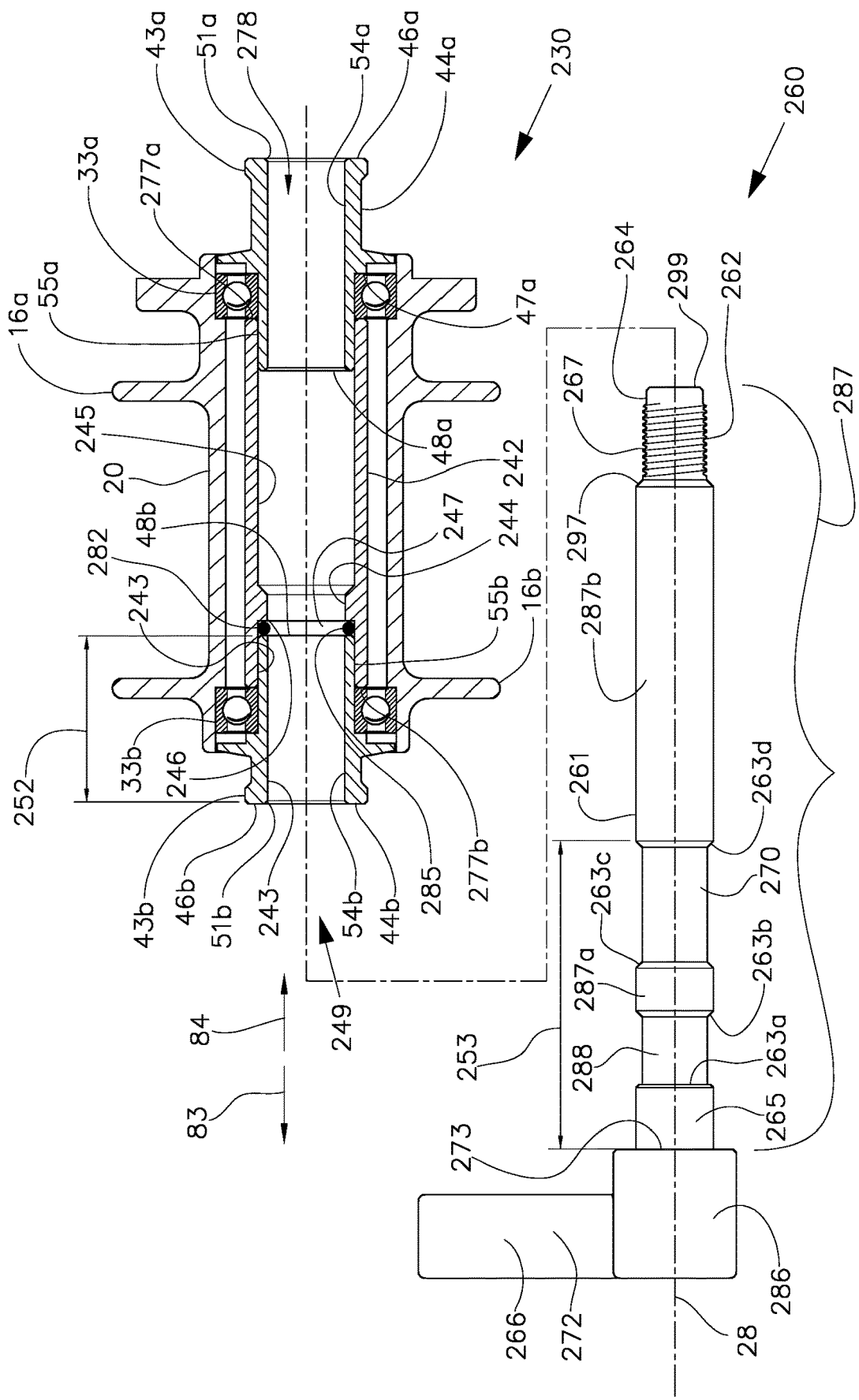
FIG. 5a is an axial cross section exploded view of a sixth embodiment of the present invention, showing the control shaft assembly prior to its assembly with the remainder of the hub assembly.

Referring to FIGS. 5a-e, dropouts 32a (left dropout) and 32b (right dropout), axlecaps 44a and 44b, bearing assemblies 33a and 33b, and hub shell 20 are identical to those described in FIG. 2a-L. It is noted that dropout 32b includes an internal threaded hole 34 sized to threadably engage with external threads 262. The hub assembly 230 includes a sleeve assembly 249, bearing assemblies 33a and 33b, and hub shell 20. The sleeve assembly 249 includes sleeve 242, axlecaps 44a and 44b, and o-ring 282. The diameter of holes 54a and 54b are preferably sized to provide a radially piloting sliding fit with the shank portions 287a and 287b. The sleeve 242 is a generally cylindrical tube that includes an axial opening 278 therethrough with end faces 277a and 277b. The opening 278 is radially stepped to include bores 243, 244, and 245. Bores 243 and 245 are sized to have a press fit assembly with collar portions 55b and 55a respectively, while bore 244 is smaller in diameter than bore 243 and is sized to have close radial clearance with shank portions 287a and 287b, including a step or transition surface 246. The hub assembly 230 is assembled as shown in FIG. 5a with the collars 55a and 55b press fit with the bores 245 and 243 respectively such that the sleeve 242 and axlecaps 44a and 44b are fixedly assembled together. Groove 247 is bounded by end face 48b, transition surface 246 and bore 243 and serves as an o-ring gland to receive the elastomeric o-ring 282 positioned therein. O-ring 282, which is similar to o-ring 82, includes a radially inward peripheral surface 285 and is fitted in the groove 247. Peripheral surface is considered as a radially inwardly extending surface of the sleeve assembly 249 that is also radially displaceable.

The control shaft assembly 260 includes the control shaft 261, having a shank 287, an enlarged head portion 286 with grip face 273, and handle 266 with a radially projecting lever portion 272 for manual manipulation by the operator in the conventional manner. The shank 287 extends axially from grip face 273 to end face 299 and includes: collar portion 265; necked portion 288 axially flanked by transition surfaces 263a and 263b; radially relieved portion 270 flanked by transition surfaces 263c and 263d; shank portions 287a and 287b; and an engagement end 267 with end face 299, external threads 262, chamfer, and pilot tip 264. Pilot tip 264 is sized to be slightly smaller than the inside diameter of internal threads 34. Necked portion 265 and relieved portion 270 are circular cylindrical surfaces of smaller diameter than adjacent step portion 265 and shank portions 287a and 287b to include transition surfaces 263a, 263b, 263c, and 263d as shown. Transition surfaces 263a-d may be considered as radially outwardly extending surfaces of the control shaft assembly 260 that is radially fixed. As shown in FIG. 5a, the control shaft assembly 260 is completely withdrawn in the retracting direction 83 to be separated from the sleeve assembly 249.

Figure 5B:
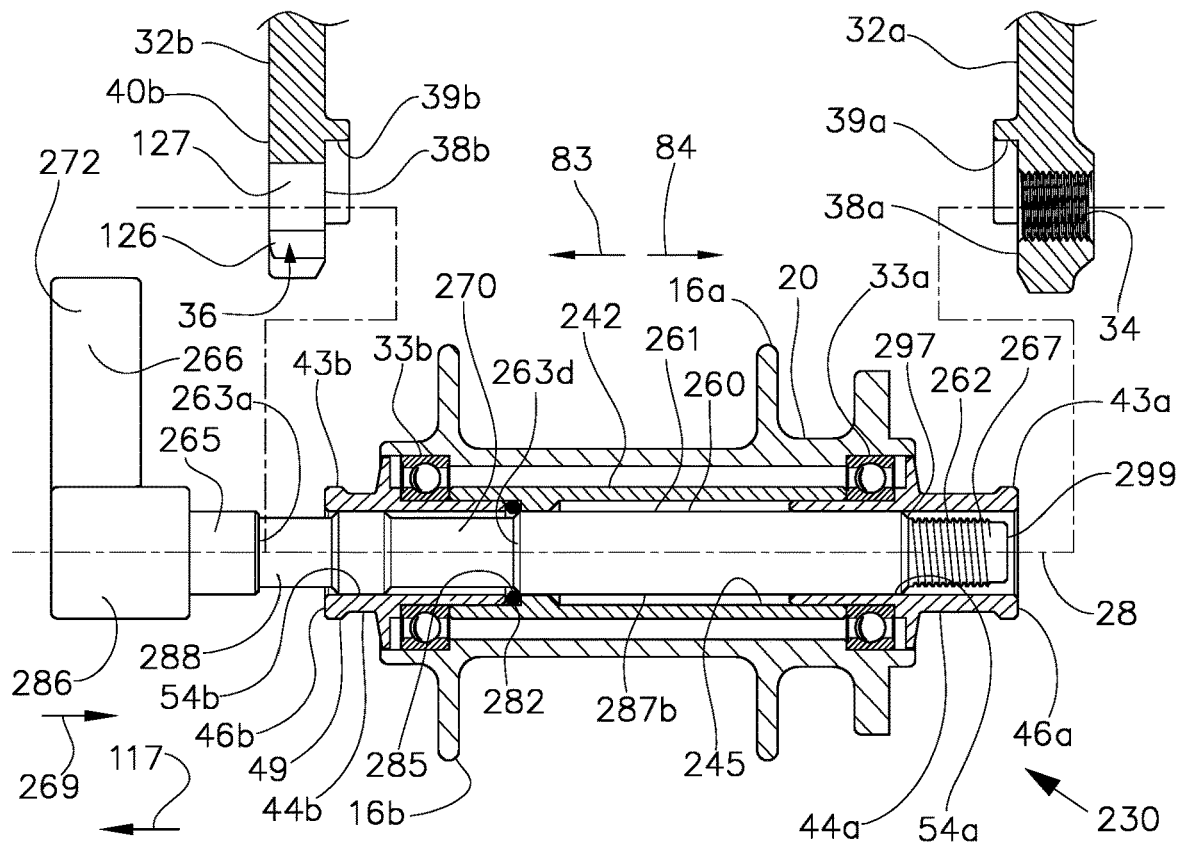
FIG. 5b is an axial cross section exploded view of the embodiment of FIG. 5a, showing the control shaft assembly as next assembled within the opening of the axle sleeve assembly, with the control shaft assembly in the retracted position in preparation for assembly with the dropouts.
Figure 5C:
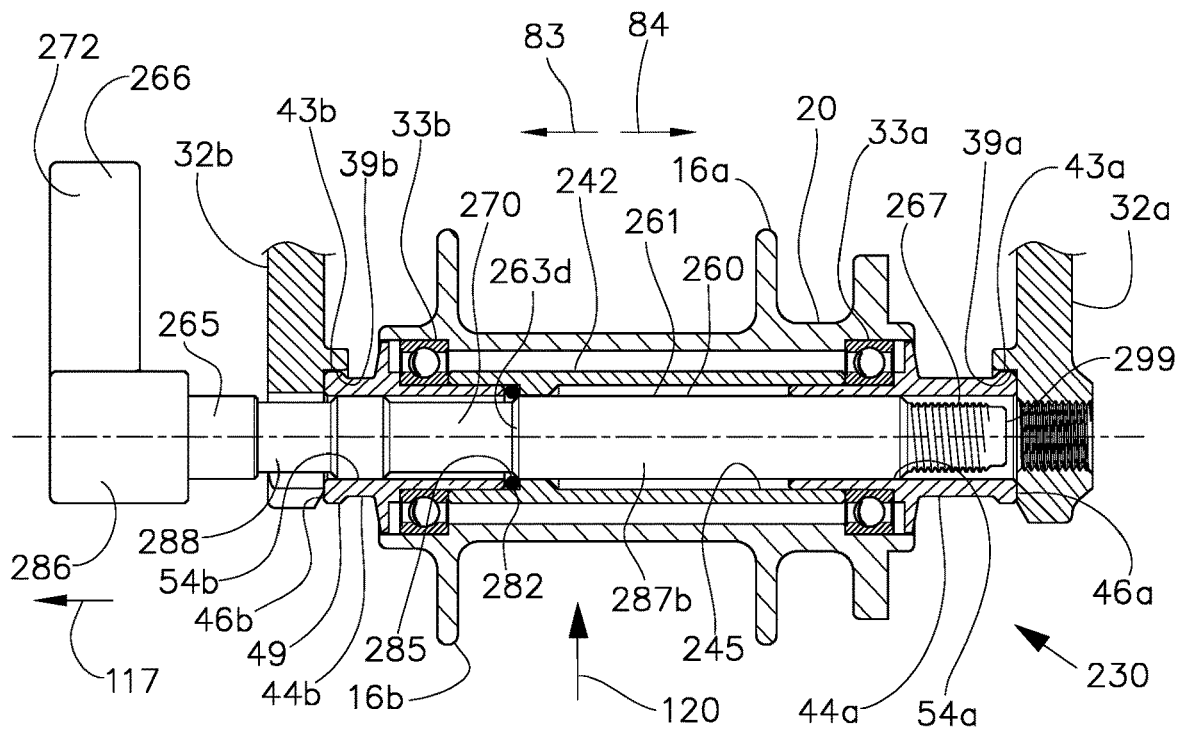
FIG. 5c is an axial cross section view of the embodiment of FIG. 5a, showing the hub assembly as next radially pre-assembled to the dropouts.

As shown in FIG. 5b, the control shaft assembly 260 has next been inserted into the opening 278 in the extending direction 84 by first passing the engagement end 267 through the hole 54b. Since there is a close clearance fit between the outside diameter of the shank portions (287a and 287b) and the inside diameter of the hole 54b, the radially inward peripheral surface 285 has a radially overlapping overlie engagement and resulting interference fit with shank portion 287b. Thus, as the shank portion 287b is pressed in direction 84 with insertion force 269 to pass through o-ring 282, the cross section of o-ring 282 will be elastically squeezed, deformed, and yielded to radially expand the radially inward peripheral surface 285 in order to fit the shank portion through the hole 54b. This deformation also results in a certain level of frictional resistance to the advancement of the control shaft assembly 260 through the hole 54b. Thus, as the shank portion 287 first contacts the peripheral surface 285, the control shaft assembly 260 must then be pressed with insertion force 269 in direction 84, with the chamfer 297 serving as a lead-in to guide and radially displace the peripheral surface 285, elastically deforming the o-ring 282 as the control shaft assembly 260 is further forcibly advanced in direction 84. This elastic deformation of the o-ring 282 is illustrated in FIG. 5e and also results in a high degree of frictional engagement between the shank portion 287b and the peripheral surface 285 to impede advancement in direction 84. However, once the transition surface 263d has further advanced past the o-ring 282, relieved portion 270 is no longer radially impinging upon the o-ring 282 and the inward peripheral surface 285 elastically springs back to its un-deformed and radially contracted diameter. The control shaft assembly 260 can now advance further in direction 84 more easily and with little or no axial assembly force 269. The relieved portion 270 is preferably smaller in diameter than the inward peripheral surface 85 of the o-ring 83 in its relaxed state. The control shaft assembly 260 is now free to be further advanced in direction 84 through the opening 278 with the shank portion 287 passing freely and easily through the opening 278 without impinging friction of the o-ring 282.

There is a fixed axial distance 252 between the outer face 46b and the end face 48b (and corresponding o-ring 82) and a fixed axial distance 253 between the grip face 273 and the transition surface 263d. Distances 252 and 253 are predetermined such that the necked portion 288 will be axially aligned with the dropout 32b when the control shaft assembly 260 is in the retracted position.

As shown in FIG. 5b, the control shaft assembly 260 has first been inserted into the sleeve assembly 249 in direction 84 to extend within opening 278 such that relieved portion 270 axially overlaps the o-ring 282. The control shaft assembly 260 has next been withdrawn in direction 83 until the transition surface 263d contacts peripheral surface 285 as shown in FIG. 5c. At this point, the radially overlying engagement between peripheral surface 285 and chamfer 263d provides a stepped increase in resistance to further advancement in direction 83, which serves to provide a tactile feedback to the operator indicating that the control shaft assembly 260 is in the axially retracted position such that the hub assembly 230 may be pre-assembled to the dropouts 32a and 32b in direction 120. The retracted position also corresponds to the transition between the free axial displacement of the relieved portion 270 within the opening 278 and the frictionally impinged axial displacement of the shank portion 287b within the o-ring 282. In this retracted position, the end face 299 is slightly axially inboard and recessed from end face 46a and the necked portion 288 is aligned to be extending axially overlapping the dropout 32b. The hub assembly 230 is shown in FIG. 5b to be axially aligned and radially offset from dropouts 32a and 32b in preparation for assembly thereto.

Next, as shown in FIG. 5c, the hub assembly 230 is moved in the generally radial direction 120 relative to the dropouts 32a and 32b, with the control shaft assembly 260 still in the retracted position, such that alignment surface 43a is radially abutting and nested with alignment surface 39a and alignment surface 43b is radially abutting and nested with alignment surface 39b in the conventional manner and as described in FIG. 2a-L. Necked portion 288 has passed through necked entrance region 126 such that it is now radially centered within pilot region 127.

Figure 5D:
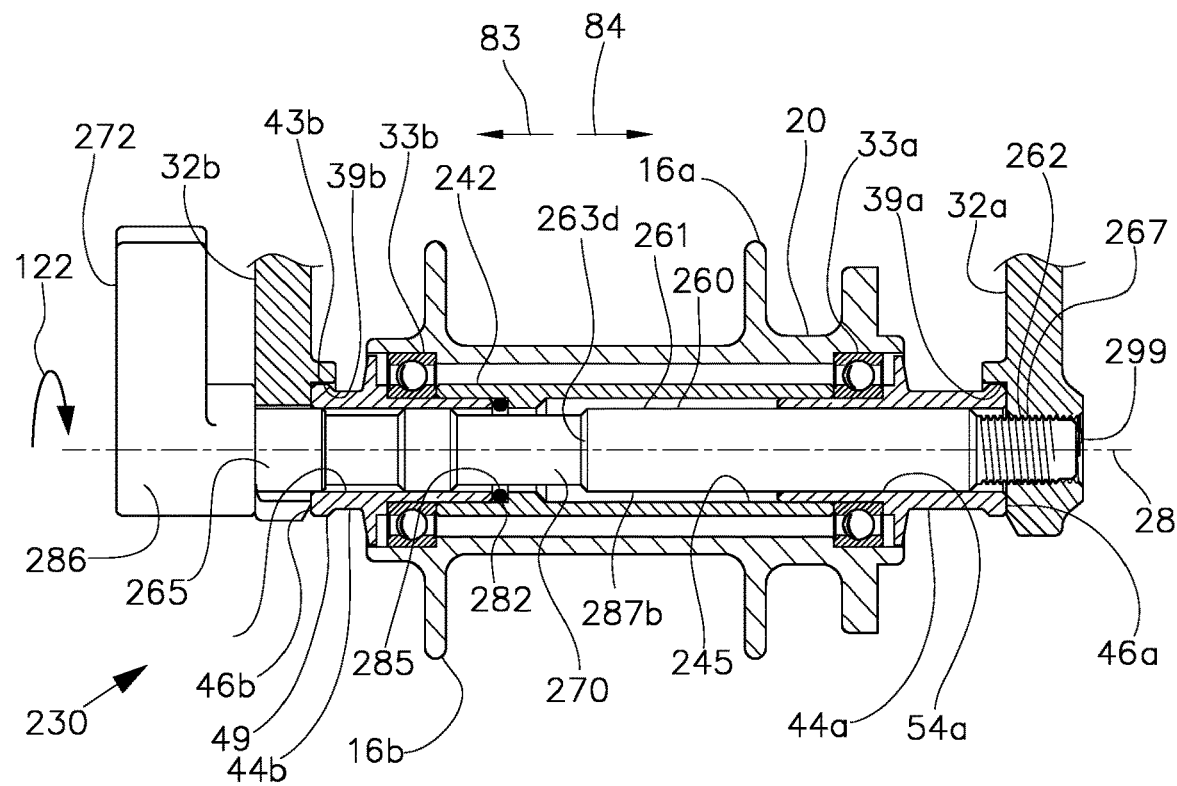
FIG. 5d is an axial cross section view of the embodiment of FIG. 5a, showing the control shaft assembly next placed in the extended position and threadably assembled to the right dropout to secure the hub assembly to the dropouts.
Figure 5E:
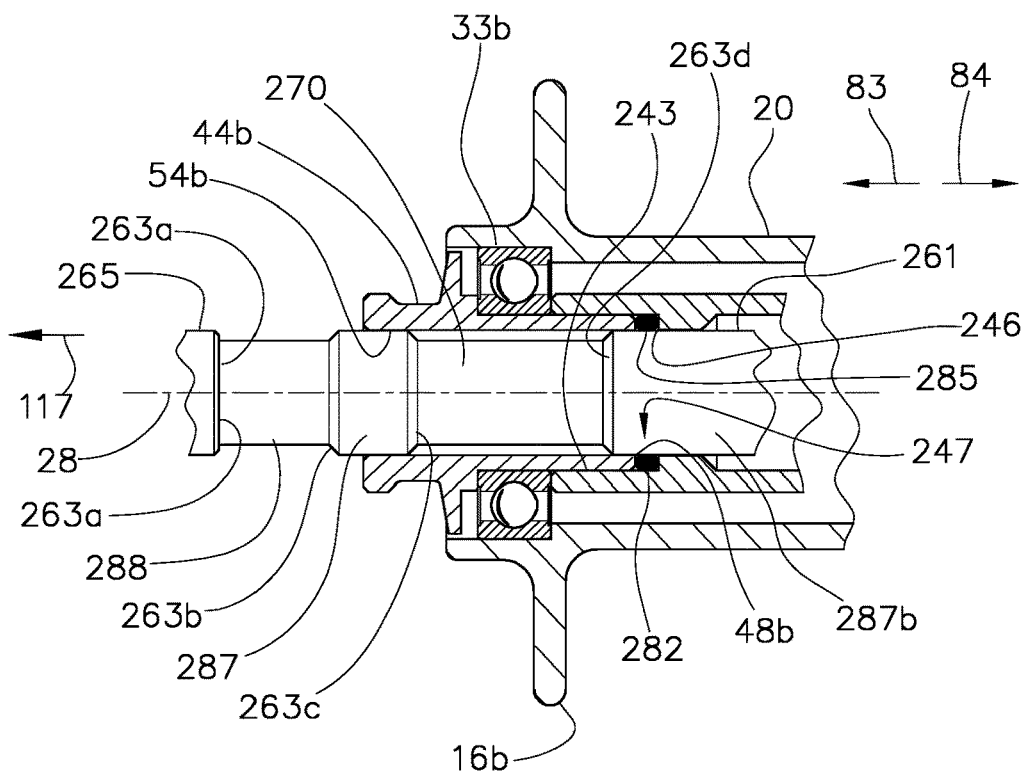
FIG. 5e is an axial cross section view of the embodiment of FIG. 5a, showing the transition between the assembly sequences of FIG. 5a and FIG. 5b where o-ring is radially yielded within the sleeve assembly.

Next, as shown in FIG. 5d, the operator has manually pressed the handle 66 in the extending direction 84 to linearly displace and shuttle the control shaft assembly 260 in direction 84 (the "extending direction") to the point that the pilot tip 264 axially overlaps the internally threaded hole 34 and the collar portion 265 axially overlaps the pilot portion 127 in a radially pre-engaged position of the control shaft assembly 260. The external threads 262 may now "catch" and be threadably engaged with internal threaded hole 34. The handle 266 is then pressed in direction 84 and also manually rotated in direction 122 to threadably engage external threads 262 with internal threaded hole 34 to threadably advance the control shaft assembly 260 in direction 84 until the grip face 273 axially presses and clamps outboard face 40b. The control shaft assembly 260 is now in the extended position and the sleeve assembly 249, and hub assembly 185 are now firmly assembled and clamped to the dropouts 32a and 32b as also described in FIGS. 2d and 2i.

The procedure for uninstallation and removal of the hub assembly 30 from the dropouts 32a and 32b is basically the reverse of the assembly and installation sequence just described. For removal, the control shaft assembly 260 is first unthreaded from the internally threaded hole 34 in a direction opposite to direction 122, via handle 266, until the external threads 262 are disengaged from the internally threaded hole 34, axially displacing the control shaft assembly 260 in the retracting direction 83.

Once the threaded engagement between the external threads 262 and internal threaded hole 34 is fully unthreaded, the handle 266 may then be freely linearly retracted and axially withdrawn with retracting force in the retracting direction 83 to the retracted position shown in FIG. 5c. There is free and easy linear advancement of the control shaft assembly 260 in between the extended and retracted positions because the peripheral surface 285 has little or no interference with the relieved portion 270 and very little retracting force 117 is required by the operator. Upon axial advancement to the retracted position, the radially overlapping overlie engagement between peripheral surface 285 and chamfer 263d provides a stepped increase in resistance and restraint against further advancement of the control shaft assembly 260 in direction 83, which serves to provide a tactile feedback to the operator indicating that the control shaft assembly 260 is again in the axially retracted position as shown in FIGS. 5b and 5c. The o-ring 282 serves as a radially displaceable restraining element (including peripheral surface 285) of the sleeve assembly 249 that provides an overlie engagement with the control shaft assembly 260 to restrain axial displacement therebetween in direction 83. The hub assembly 230 may now be radially disassembled and removed from the dropouts 32a and 32b in a direction opposite to direction 120 as shown in FIG. 5b.

In the case where the user would like to completely withdraw and remove the control shaft assembly 260 from the sleeve assembly 249, the user may forcibly withdraw the control shaft assembly 260 further in direction 83 with an incrementally greater extraction force 117 sufficient to radially deform the o-ring 282 and yield the peripheral surface 285 to overcome the radially overlying engagement between the o-ring 282 and the transition surface 263d. Transition surface 263d serves as a funneling lead-in to guide and radially yield to wedge and displace the peripheral surface 285 radially outwardly to deform the cross section of the o-ring 282 as shown in FIG. 5e. This elastic deformation of the o-ring 282 results in a high degree of frictional wiping engagement between the shank portion 287b and the peripheral surface 285 to impede and resist advancement in direction 83. However, once the shank portion 287b has advanced axially outwardly past the end face 48b, the o-ring 282 is no longer impinging upon the shank portion 287b and the inward peripheral surface 285 elastically springs back to its un-deformed and radially contracted diameter. The control shaft assembly 260 can now be completely withdrawn and separated from the remainder of the hub assembly 230 as shown in FIG. 5a.

While my above description contains many specificities, these should not be construed as limitations on the scope of the invention, but rather as exemplifications of embodiments thereof. For example:

The o-rings 82 and 282, split ring 140, detent balls 74, and engagement balls 214 are merely representative of a wide range of possible configurations that may provide a radially displaceable engagement surface of the control shaft assembly and/or sleeve assembly. Some alternate radially displaceable engagement surfaces may include spring fingers, pawls, rockers, levers, flexure, etc. Further, o-rings 82 and 282, split ring 140, detent balls 74, and engagement balls 214 may be considered as restraining or engagement elements that are separate from the associated control shaft or sleeve assembly to which they are axially engaged. Alternatively, the radially displaceable engagement surface may be unitarily formed directly within its associated control shaft or sleeve assembly.

While the sleeve assemblies and control shaft assemblies are labeled herein as "assemblies", this is simply for terminology purpose only, since these assemblies commonly include multiple components. However, it is understood that the sleeve assembly and/or the control shaft assembly may alternatively be formed as a single unitary unit with all of the pertinent features required for function as described herein.

The sleeve assembly 49 of FIG. 2a-L shows a transition or step surface as formed in the axlecap 44b. It is understood that the sleeve assembly 49 shown is merely representative of a wide range of possible arrangements that may alternatively be substituted for this sleeve assembly 49. The sleeve assembly merely needs to include a through opening corresponding to opening 79, a transition or radially stepped surface corresponding to chamfer 50b and/or end face 48b, and preferably axially opposing end faces corresponding to end faces 46a and 46b. For example, some of the features and geometry of the axlecaps 44a and 44b may be combined with the sleeve 42 into one unitary and monolithic element.

The embodiment of FIG. 2a-L shows the radially displaceable engagement surface (i.e. peripheral surface 85) being axially fixed to the control shaft assembly 60 and a radially rigid and fixed engagement surface (i.e. chamfer 50*b*, end face 48*b*, and hole 54*b*) being axially fixed to the sleeve assembly 49. Whereas the embodiment of FIGS. 5*a-e* shows the radially displaceable engagement surface (i.e. peripheral surface 285) being axially fixed to the control sleeve assembly 249 and a radially rigid and fixed engagement surface (i.e. chamfer 263*d* and shank portion 287*b*) being axially fixed to the control shaft assembly 260. Alternatively, a second radially displaceable engagement surface may be substituted for the radially rigid and fixed engagement surface. For example, a control shaft assembly similar to that of FIGS. 2*a*-L may be utilized in conjunction with a sleeve assembly similar to that of FIGS. 5*a-e*, such that the engagement interface may be between the radially displaceable peripheral surfaces 85 and 285.

It is noted that the engagement surfaces shown in these embodiments are generally circumferentially constant and do not vary appreciably in the circumferential direction. As such, the engagement interface does not appreciably change with respect to the circumferential orientation of the control shaft relative to the sleeve assembly. However, one or both engagement surfaces may alternatively be circumferentially variable such that the engagement interface may be different depending on this circumferential orientation.

The radially displaceable engagement surfaces (i.e. surfaces 85, 143, 158, 279) are shown to be axially constrained relative to their respective control shaft assemblies. Similarly, engagement surface 285 is shown to be axially constrained relative to sleeve assembly 249. In the example of FIG. 2*a*-L, o-ring 82 is axially constrained in groove 89. The axial width of groove 89 is sized to provide clearance for radial displacement of o-ring 82, which may allow for some axial displacement between peripheral surface 82 and groove 89. However, this axial displacement is shown to be relatively small and the peripheral surface is considered to be generally axially fixed relative to the control shaft assembly 60. However, it is envisioned that the groove may alternatively have an axial width that is significantly larger than that of the o-ring 82. In this case, the o-ring 82 may be axially displaceable relative to control shaft assembly. This may be desirable to, for example, to permit a certain amount of axial shift or free-play therebetween. Similarly, a radially fixed engagement surface, such as chamfer 50*b* of FIG. 2*a*-L, may be in a secondary or intermediate element that is axially displaceable relative to the sleeve assembly 49, as is shown in FIGS. 4*a-f*, where transition surface 177 is axially displaceable relative to the remainder of the sleeve assembly 169.

In FIG. 2*a*-L, chamfers 51*b* and 50*b* are included to provide a camming and funneling lead-in for the radially displaceable engagement surface (i.e. peripheral surface 82) to prevent damage to the o-ring 82 and to control the insertion force 69 and extraction/withdrawal force 118 required. Alternatively, chamfers 51*b* and/or 50*b* may have any desired contour to provide camming funneling and to ease the insertion and extraction of the control shaft. As a further alternative, chamfers 51*b* and/or 50*b* may be eliminated in favor of square corners without appreciable camming or funneling.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
an axle sleeve that is rotationally stationary about an axial axis and that includes: a first end face; a second end face axially spaced from said first end face; an axially extending opening therethrough; and a radially extending first engagement surface;
a control shaft including: an engagement end; a control end axially opposed said engagement end; and a radially extending second engagement surface;
a frame including a first frame element that includes a first frame opening therein;
wherein said control shaft extends within said opening to be axially overlapping said axle sleeve with said engagement end proximal said first end face and distal said second end face;
wherein said control shaft is axially displaceable relative to said axle sleeve in an extending direction toward said first end face and an retracting direction axially opposed to said extending direction and toward said second end face;
wherein said control shaft is axially retained to said axle sleeve by means of an overlie engagement at an engagement interface between said first engagement surface and said second engagement surface;
wherein at least one of said first engagement surface and said second engagement surface is a radially displaceable engagement surface such that said radially displaceable surface may be radially displaced between an engaged orientation corresponding to said overlie engagement and a released orientation corresponding to a release of said overlie engagement;
wherein said overlie engagement is functional to axially retain said control shaft to said axle sleeve and wherein said released orientation is functional to release said overlie engagement and to permit said control shaft to be axially withdrawn and separated from said axle sleeve in said retracting direction;
wherein said control shaft may be axially displaced relative to said axle sleeve: (i) in said extending direction to an axially extended position wherein said engagement end projects axially outwardly from said first end face; (ii) in said retracting direction to an axially retracted position wherein said engagement end is axially inward relative to said extended position and said first engagement surface is axially abutting said second engagement surface in said overlie engagement; and (iii) in said retracting direction relative to said retracted position to an axially withdrawn position, wherein said second engagement surface is positioned to be axially beyond said first engagement surface in said retracting direction;
wherein said engagement end is axially overlapping said first frame opening in said engaged position to limit radial displacement therebetween, and wherein said engagement end may be radially displaced and removed from said first frame opening in said retracted position; and
including a first restraining resistance to axial displacement within a first axial displacement range between said extended position and said retracted position and a second restraining resistance to axial displacement within a second axial displacement range between said retracted position and said withdrawn position, wherein said second restraining resistance is greater than said first restraining resistance.

2. The vehicle wheel axle assembly according to claim 1, wherein said second engagement surface is said radially displaceable surface and said first engagement surface is a radially fixed surface.

3. The vehicle wheel axle assembly according to claim 1, wherein said first engagement surface is said radially displaceable surface and said second engagement surface is a radially fixed surface.

4. The vehicle wheel axle assembly according to claim 1, including a generally fixed axial distance between said first engagement surface and said first end face.

5. The vehicle wheel axle assembly according to claim 1, including a generally fixed axial distance between said second engagement surface and said engagement end.

6. The vehicle wheel axle assembly according to claim 1, wherein said first engagement surface is formed directly in said axle sleeve.

7. The vehicle wheel axle assembly according to claim 1, wherein said first engagement surface is radially displaceable and is radially inwardly biased toward said engaged orientation.

8. The vehicle wheel axle assembly according to claim 1, wherein said overlie engagement serves to axially restrain said control shaft at a predetermined axial position relative to said axle sleeve.

9. The vehicle wheel axle assembly according to claim 1, wherein said overlie engagement is maintained irrespective of the angular orientation between said control shaft and said axle sleeve about said axial axis.

10. The vehicle wheel axle assembly according to claim 1, wherein the transition between said first restraining resistance and said second restraining resistance is a stepped increase in restraining resistance to provide tactile feedback to the operator.

11. The vehicle wheel axle assembly according to claim 1, wherein the transition between said first restraining resistance and said second restraining resistance corresponds to said retracted position.

12. The vehicle wheel axle assembly according to claim 1, wherein said first restraining resistance is a free restraining resistance throughout said first axial displacement range.

13. The vehicle wheel axle assembly according to claim 1, wherein, within the axial displacement range between said retracted position and said extended position, said control shaft may be rotated relative to said axle sleeve about said axial axis independently of said axial displacement.

14. The vehicle wheel axle assembly according to claim 1, wherein said control shaft may be linearly shuttled without rotation of said control shaft relative to said axle sleeve in the axial displacement range between said retracted position and said withdrawn position.

15. The vehicle wheel axle assembly according to claim 1, wherein said radially displaceable engagement surface is in a restraining element discreet from the corresponding one of said control shaft and said axle sleeve and wherein said restraining element is axially engaged to said control shaft to limit the axial displacement of said restraining element relative to said control shaft.

16. The vehicle wheel axle assembly according to claim 15, wherein said restraining element is an elastically deformable restraining element that is elastically deformed between said engaged orientation and said released orientation wherein said elastic deformation includes circumferential deformation of said restraining element.

17. The vehicle wheel axle assembly according to claim 16, wherein: said radially displaceable engagement surface is in a restraining element discreet from the corresponding one of said control shaft and said axle sleeve; said restraining element is an elastically deformable restraining element that is elastically deformed between said engaged orientation and said released orientation; said restraining element is a split annular element that partially circumscribes said control shaft, including a circumferential gap of said restraining element having a circumferential gap dimension; and wherein said elastic deformation is circumferential deformation to circumferentially vary said gap dimension.

18. The vehicle wheel axle assembly according to claim 15, wherein said restraining element may be circumferentially rotated relative to the corresponding one of said control shaft and said axle sleeve.

19. The vehicle wheel axle assembly according to claim 1, wherein said radially displaceable engagement surface is in a restraining element discreet from the corresponding one of said control shaft and said axle sleeve and wherein said restraining element is axially engaged to said axle sleeve to limit the axial displacement of said restraining element relative to said axle sleeve.

20. The vehicle wheel axle assembly according to claim 1, wherein: said radially displaceable engagement surface is in a restraining element discreet from the corresponding one of said control shaft and said axle sleeve; wherein said restraining element is an elastically deformable restraining element that is elastically deformed between said engaged orientation and said released orientation; and wherein said elastic deformation includes radial cross section deformation of said restraining element.

21. The vehicle wheel axle assembly according to claim 20, wherein said restraining element is a resilient elastomeric element.

22. The vehicle wheel axle assembly according to claim 20, wherein said restraining element is an annular element that fully circumscribes said control shaft.

23. The vehicle wheel axle assembly according to claim 1, wherein said radially displaceable engagement surface is in a restraining element discreet from the corresponding one of said control shaft and said axle sleeve and wherein said restraining element is a radially rigid element such that the radial cross section of said restraining element remains undeformed between said engaged orientation and said released orientation and including a biasing means to bias said radially displaceable engagement surface toward said engaged orientation.

24. The vehicle wheel axle assembly according to claim 1, including a biasing element discreet from said restraining element, wherein said biasing element serves to bias said radially displaceable engagement surface toward said engaged orientation, wherein said overlie engagement is maintained irrespective of the angular orientation between said control shaft and said axle sleeve about said axial axis.

25. The vehicle wheel axle assembly according to claim 1, wherein said second engagement surface is said radially displaceable engagement surface and said first engagement surface is a radially wedging engagement surface functional to radially wedge said second engagement surface toward said released orientation as said control shaft is axially displaced from said retracted position in said retracting direction.

26. The vehicle wheel axle assembly according to claim 1, wherein said first engagement surface is said radially displaceable engagement surface and said second engagement surface is a radially wedging engagement surface functional to radially wedge said first engagement surface toward said released orientation as said control shaft is axially displaced from said retracted position in said retracting direction.

27. The vehicle wheel axle assembly according to claim 1, wherein said opening includes a first opening portion axially proximal said first end face and a second opening portion axially distal said first end face relative to said first opening portion, wherein said second opening portion is radially outward of said first opening portion, and wherein said first engagement surface is in the transition between said second opening portion and said first opening portion.

28. The vehicle wheel axle assembly according to claim 1, wherein said overlie engagement is a passively yieldable radially overlie engagement such that said radially displaceable engagement surface may be yieldably displaced between said engaged orientation and said released orientation.

29. The vehicle wheel axle assembly according to claim 1, wherein said engagement end is one of generally flush or recessed relative to said first end face at said axially retracted position.

30. The vehicle wheel axle assembly according to claim 1, wherein said first restraining resistance is generally constant throughout said first axial displacement range.

31. The vehicle wheel axle assembly according to claim 1, wherein, within said first axial displacement range, said axial abutting between said first engagement surface and said second engagement surface occurs solely in said retracting direction.

32. The vehicle wheel axle assembly according to claim 1, including at least one of: (i) radial clearance between said second engagement surface and said opening throughout said first axial displacement range; and (ii) radial clearance between said first engagement surface and said control shaft throughout said first axial displacement range.

33. The vehicle wheel axle assembly according to claim 1, wherein said overlie engagement is a singular overlie engagement throughout said first axial displacement range.

34. A vehicle wheel axle assembly, comprising:
an axle sleeve that is rotationally stationary about an axial axis and that includes: a first end face; a second end face axially spaced from said first end face; an axially extending opening therethrough; and a radially extending first engagement surface;
a control shaft including: an engagement end; a control end axially opposed said engagement end; and a radially extending second engagement surface;
wherein said control shaft extends within said opening to be axially overlapping said axle sleeve with said engagement end proximal said first end face and distal said second end face;
wherein said control shaft is axially displaceable relative to said axle sleeve in an extending direction toward said first end face and an retracting direction axially opposed to said extending direction and toward said second end face;
wherein said control shaft is axially retained to said axle sleeve by means of an overlie engagement at an engagement interface between said first engagement surface and said second engagement surface;
wherein at least one of said first engagement surface and said second engagement surface is a radially displaceable engagement surface such that said radially displaceable surface may be radially displaced between an engaged orientation corresponding to said overlie engagement and a released orientation corresponding to a release of said overlie engagement;
wherein said overlie engagement is functional to axially retain said control shaft to said axle sleeve and wherein said released orientation is functional to release said overlie engagement and to permit said control shaft to be axially withdrawn and separated from said axle sleeve in said retracting direction; and
wherein said radially displaceable engagement surface may be manipulated between: (i) a locked orientation wherein said radially displaceable engagement surface is radially locked and unyieldable to maintain said engaged orientation; and (ii) an unlocked orientation wherein said radially displaceable engagement surface may be radially displaced to said released orientation from said engaged orientation.

35. The vehicle wheel axle assembly according to claim 34, wherein said radially displaceable engagement surface may be actively manipulated between said engaged orientation and said released orientation.

36. The vehicle wheel axle assembly according to claim 34, wherein said restraining element is a radially rigid element such that the radial cross section of said restraining element remains undeformed between said engaged orientation and said released orientation.

37. A vehicle wheel axle assembly, comprising:
an axle sleeve that is rotationally stationary about an axial axis and that includes: a first end face; a second end face axially spaced from said first end face; an axially extending opening therethrough; and a radially extending first engagement surface;
a control shaft including: an engagement end; a control end axially opposed said engagement end; and a radially extending second engagement surface;
wherein said control shaft extends within said opening to be axially overlapping said axle sleeve with said engagement end proximal said first end face and distal said second end face;
wherein said control shaft is axially displaceable relative to said axle sleeve in an extending direction toward said first end face and an retracting direction axially opposed to said extending direction and toward said second end face;
wherein said control shaft is axially retained to said axle sleeve by means of an overlie engagement at an engagement interface between said first engagement surface and said second engagement surface;
wherein at least one of said first engagement surface and said second engagement surface is a radially displaceable engagement surface such that said radially displaceable surface may be radially displaced between an engaged orientation corresponding to said overlie engagement and a released orientation corresponding to a release of said overlie engagement;
wherein said overlie engagement is functional to axially retain said control shaft to said axle sleeve and wherein said released orientation is functional to release said overlie engagement and to permit said control shaft to be axially withdrawn and separated from said axle sleeve in said retracting direction; and
wherein said radially displaceable engagement surface may be actively manipulated between said engaged orientation and said released orientation by an active manipulation means that is independent of said axial displacement of said control shaft relative to said axle sleeve.

38. The vehicle wheel axle assembly according to claim 37, wherein said radially displaceable engagement surface may be remotely manipulated between said engaged orientation and said released orientation.

39. A vehicle wheel axle assembly, comprising:
an axle sleeve that is rotationally stationary about an axial axis and that includes: a first end face; a second end face axially spaced from said first end face; an axially extending opening therethrough; and a radially extending first engagement surface;
a control shaft including: an engagement end; a control end axially opposed said engagement end; and a radially extending second engagement surface;
wherein said control shaft extends within said opening to be axially overlapping said axle sleeve with said engagement end proximal said first end face and distal said second end face;
wherein said control shaft is axially displaceable relative to said axle sleeve in an extending direction toward said first end face and an retracting direction axially opposed to said extending direction and toward said second end face;
wherein said control shaft is axially retained to said axle sleeve by means of an overlie engagement at an engagement interface between said first engagement surface and said second engagement surface;
wherein at least one of said first engagement surface and said second engagement surface is a radially displaceable engagement surface such that said radially displaceable surface may be radially displaced between an engaged orientation corresponding to said overlie engagement and a released orientation corresponding to a release of said overlie engagement;
wherein said overlie engagement is functional to axially retain said control shaft to said axle sleeve and wherein said released orientation is functional to release said overlie engagement and to permit said control shaft to be axially withdrawn and separated from said axle sleeve in said retracting direction;
wherein said control shaft may be axially displaced relative to said axle sleeve: (i) in said extending direction to an axially extended position wherein said engagement end projects axially outwardly from said first end face; (ii) in said retracting direction to an axially retracted position wherein said engagement end is axially inward relative to said extended position and said first engagement surface is axially abutting said second engagement surface in said overlie engagement; and (iii) in said retracting direction relative to said retracted position to an axially withdrawn position, wherein said second engagement surface is positioned to be axially beyond said first engagement surface in said retracting direction; and
wherein said axle sleeve includes an intermediate sleeve element that is axially displaceable relative to said axle sleeve, wherein said first engagement surface is in said intermediate sleeve element, and wherein said intermediate sleeve element is engaged to said axle sleeve to limit axial displacement therebetween in said retracting direction.

40. The vehicle wheel axle assembly according to claim 39, including a biasing means to axially bias said intermediate sleeve element relative to said axle sleeve.

41. The vehicle wheel axle assembly according to claim 40, wherein said biasing means serves to bias said control shaft in said extending direction.

* * * * *